United States Patent
Kenney et al.

[11] Patent Number: 5,970,186
[45] Date of Patent: Oct. 19, 1999

[54] HYBRID DIGITAL ELECTRO-OPTIC SWITCH

[75] Inventors: John T. Kenney, Palo Alto; Richard D. Sherman, Santa Monica, both of Calif.

[73] Assignee: Lightwave Microsystems Corporation, Santa Clara, Calif.

[21] Appl. No.: 08/816,124

[22] Filed: Mar. 11, 1997

[51] Int. Cl.[6] ........................................ G02B 6/26
[52] U.S. Cl. ............................ 385/16; 385/126; 385/122
[58] Field of Search ........................ 385/16–23, 122–128

[56] References Cited

U.S. PATENT DOCUMENTS

| | | |
|---|---|---|
| 3,580,656 | 5/1971 | Carson . |
| 4,708,423 | 11/1987 | Erman et al. . |
| 4,840,446 | 6/1989 | Nakamura et al. . |
| 4,895,615 | 1/1990 | Muschke . |
| 5,008,043 | 4/1991 | Robello et al. .................... 252/582 |
| 5,133,037 | 7/1992 | Yoon et al. ......................... 385/132 |
| 5,157,756 | 10/1992 | Nishimoto . |
| 5,206,925 | 4/1993 | Nakazawa et al. . |
| 5,281,305 | 1/1994 | Lee et al. . |
| 5,387,269 | 2/1995 | Nijander et al. . |
| 5,395,556 | 3/1995 | Drost et al. ......................... 252/582 |
| 5,465,860 | 11/1995 | Fujimoto et al. . |
| 5,514,799 | 5/1996 | Varanasi et al. .................... 544/300 |
| 5,581,642 | 12/1996 | Deacon et al. . |
| 5,678,935 | 10/1997 | Sakata . |
| 5,703,989 | 12/1997 | Khan et al. . |

FOREIGN PATENT DOCUMENTS

| | | |
|---|---|---|
| 0445527 | 9/1991 | European Pat. Off. . |
| 0621504 | 10/1994 | European Pat. Off. . |
| 62-119504 | 5/1987 | Japan . |
| 63-44604 | 2/1988 | Japan . |
| 01-248107 | 10/1989 | Japan . |
| 03-296003 | 12/1991 | Japan . |
| 06-214275 | 8/1994 | Japan . |
| 09-022035 | 1/1997 | Japan . |
| 2199157 | 6/1988 | United Kingdom . |
| 90/09605 | 8/1990 | WIPO . |

OTHER PUBLICATIONS

Nishihara et al., *Optical Integrated Circuits* (1985) McGraw–Hill, pp. 29–32, 46–61 (Cover page and table of contents enclosed herewith).

Chen, et al., "Facile Approach to Nonlinear Optical Side–Chain Aromatic Polyimides with Large Second–Order Nonlinearity and Thermal Stability", J.Am. Chem. Soc., vol. 117, No. 27, pp. 7295–7296 (1995).

Cloonan, T., "Applications of Free–Space photonic Technology for ATM Switching", IEEE Lasers and Electro–Optics Society Meeting, pp. 228–229 (1994).

(List continued on next page.)

*Primary Examiner*—Phan T. H. Palmer
*Attorney, Agent, or Firm*—Morrison & Foerster LLP

[57] ABSTRACT

A hybrid digital electro-optic switch has core and/or cladding areas that contain at least two different materials which undergo a change in their refractive index when an electric field is applied. One of the two different materials used in core regions, for example, has a change in refractive index that is less than the change in refractive index for the other material when the materials are exposed to the same electric field. A hybrid digital electro-optic switch functions by modulating the propagation constants of the eigenmodes of the switch with a voltage-induced refractive-index change, so that the propagation constants of the two materials are equal either in the presence or absence of the electric field. These electro-optic modulations change the evanescent coupling between the waveguides of the waveguide regions of the switch and transfer an optical signal that was input into one of the waveguides to a coupled waveguide. Compared to earlier digital electro-optic switch designs, the new switch has lower switching voltage, smaller device size, a sharper optical signal transfer, and wider manufacturing and use tolerances, and the switch can use a wide array of materials in its construction. The new switch can also be integrated with both the microstrip and coplanar traveling wave electrodes for very high speed photonic switching applications.

25 Claims, 27 Drawing Sheets

OTHER PUBLICATIONS

Cloonan, T., "Promises and Challenges for Free–Space Digital Optics in Switching Systems Beyond the Year 2000", SPIE, vol. 2400, pp. 2–7, Feb. 1995.

DeVoe, et al., "Precision Measurements of the Lifetime of a Single Trapped Ion with a Nonlinear Electro–Optic Switch", Optical Society of America, pp. 1891–1893, Nov. 1994.

Erman, et al., "Semiconductor Digital Optical Switches and Arrays", Optical Society of America, vol. 4, p. 53, Feb. 1994.

Nelson, et al., "Large–Angle 1.3–um INP/INGaAsP Digital Optical Switches with Extinction Ratios Exceeding 20 dB", Optical Society of America, vol. 4, p. 53, Feb. 1994.

Falk, et al., "Electro–Optic Imagery of High–Voltage GaAs Photoconductive Switches", IEEE Electron Devices, vol. 4, No. 1, pp. 43–49, Jan. 1995.

Ferstl, M., "Fresnel Zone Lenses for an Electro–Optical 2×2–Switch", SPIE, vol. 2404, pp. 277–285, Feb. 1995.

Gao, et al., "Si1–xGEx/Si Asymmetric 2×2 Eletro–Optical Switch of Total Internal Reflection Type", Appl. Phys. Lett., vol. 67, No. 23, pp. 3379–3380, Dec. 1995.

Hornak, L..., "Polymers for Lightwave and Integrated Optics", Marcel Dekker, Inc., pp. 433–472 (1992).

Ivanov, et al., "Modeling of a Low–Intensity Electro–Optical Semiconductor Switching Device Due to Intrinsic Photoconductivity", J. Appl. Phys., vol. 76, No. 4, pp. 2522–2528, Aug. 1994.

Morrison, et al., "Diode–Pumped, Q–Switched, 1.321um Nd:YLF Laser and its Frequency Doubling", Optics Communications, vol. 118, pp. 55–60, Jan. 1995.

Oh–e, et al., "Electro–Optical Characteristics and Switching Behavior of the In–Plane Switching Mode", Appl. Phys. Lett., vol. 67, No. 26, pp. 3895–3897, Dec. 1995.

Shiqing, et al., "Generation of 2–10 ns XeCl Laser Pulses by Direct Wave Clipping with an Electro–Optical Q–Switching", Chinese Journal of Lasers, vol. A22, No. 9, pp. 675–680, Sep. 1995.

Silberberg, et al., "Digital Optical Switch", Appl. Phys. Lett., vol. 15, No. 16, pp. 1230–1232, Oct. 1987.

Streifer, et al., "Reformulation of the Coupled–Mode Theory of Multiwaveguide Systems", Journal of Lightwave Technology, vol. LT5, No. 1, pp. 1–4, Jan. 1987.

Zayhowski, et al., "Coupled–Cavity Electro–Optically Q–Switched Nd:YV04 Microchip Lasers", Optics Letters, vol. 20, No. 7, pp. 716–718, Apr. 1995.

Anonymous, "Optical Signal Distribution by Filled–Trench Channel Polymer Waveguide" *IBM Technical Disclosure Bulletin* 34(9):411–412 (Feb. 1992).

Heidrich, P.F. and White, J.M., "Electronically Variable Tap for Multimode Planar Ribbon Optical Waveguides", *IBM Technical Disclosure Bulletin* 18(9):3132–3133 (Feb. 1976).

Hikita, M. et al., "Optical intensity modulation in a vertically stacked coupler incorporating electro–optic polymer" *Applied Physics Letters* 63(9):1161–1163 (1993).

Mori, H., "Ridge wavguide without high refractive index layer: Multilayer side cladded ridge waveguide" *Applied Optics* 17(1):105–108 (Jan. 1, 1978).

Ramey, D.A. and Boyd, J.T., "Polyurethane Fan–Out Channel Waveguide Array for High Resolution Optical Waveguide Imaging" *IEEE Trans.Circuits and Systems CAS* 26(12):1041–1048 (Dec. 1979).

Ruberto, M.N. et al., "Graded–Effective–Index Waveguiding Structures Fabricated with Laser Processing" *Digital Optical Computing II, SPIE* 1215:538–557 (1990).

PRIOR ART

Traveling-wave Mach-Zehnder switch

PRIOR ART

Variation of the output light intensity with the applied voltage in the waveguide interferometric modulator, where $r_p = |E_A|^2/|E_B|^2$ Uniform $\Delta\beta$ directional coupler having the coupling coefficient $k$ and the coupling length $l$.
The crossover state is obtained only when $l = (2n+1)L$ and $\Delta\beta = 0$.

PRIOR ART

Uniform Δβ directional coupler having the coupling coefficient k and the coupling length l. The crossover state is obtained only when l = (2n + 1)L and Δβ = 0.

Branching waveguide switch in Z-cut LiNbO₃

PRIOR ART

Total-internal-reflection (TIR) switch using a crossed waveguide in Y-cut LiNbO$_3$

PRIOR ART

(a) Transmission type (b) Reflection type

Multimode star couplers using ion-exchanged glass waveguides

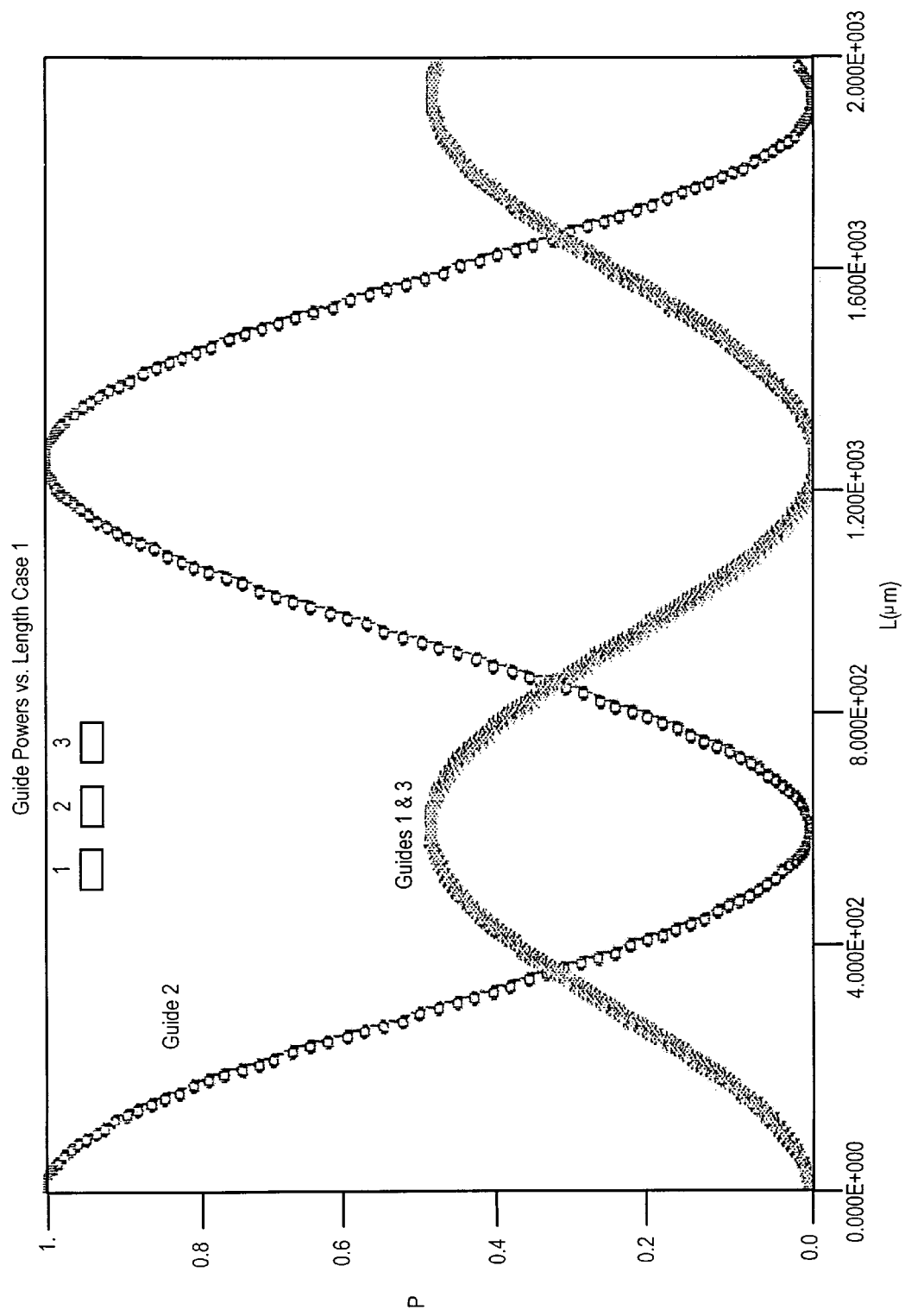

Ultradel 4212

OPI1305 - x/y = 70/30
OPI2005 - y = 100%

Hitachi PIQ L100

HYBRID DIGITAL ELECTRO-OPTIC SWITCH

This application is related to the following applications that are being filed concurrently with this application, which applications are incorporated by reference in their entirety herein as if originally put forth below:

Method of Making Optical Interconnects with Hybrid Construction,
  Inventors: Edward S. Binkley, James C. Nurse
Optical Interconnects with Hybrid Construction,
  Inventors: Edward S. Binkley, John T. Kenney, Marc A. Stiller

BACKGROUND OF THE INVENTION

Photonic switches play very important roles in advanced technologies such as telecommunications, data communications, computer interconnects, optical computing and optical signal processing. A large variety of optical switches have been developed for these applications, including electro-optic, acoustic-optic, magneto-optic and thermo-optic switches. These devices can switch optical signals from one pathway to another within a few fento-seconds to a few milliseconds depending on the switching mechanisms. Among these varieties, the electro-optic switch remains the most widely researched and used.

An electro-optic switch typically has at least one input waveguide and at least two output waveguides for carrying an optical signal. Waveguides are usually slabs, strips, or cylinders of a dielectric material or materials in "core" regions of the switch, and the waveguides are surrounded by another dielectric material ("cladding" located in cladding regions of the switch) having a lower refractive index than the material used to make its neighboring core. An optical signal enters an electro-optic switch through an inlet waveguide, and the optical signal leaves the switch from one or more output waveguides. In the conventional electro-optic switch, the cores are made of a material that changes refractive index when the material is exposed to an electric field that is created by a voltage applied to electrodes near the material. A desired amount of the power of the optical signal input into the switch is distributed to each of the exit points of the output waveguides by e.g. changing the speed at which the optical signal is transmitted through one or more waveguides within the switch.

There are at least six classifications of electro-optic switches that utilize an electro-optic material within the switch. The first classification is an interferometric-based switch such as the Mach-Zehnder switch formed in crystalline $LiNbO_3$ and illustrated in FIG. 1A. Typically, two cores are fabricated in the switch by diffusing approximately equal amounts of titanium into the crystal. The two cores are thus made of the same electro-optic material having a refractive index $n_1$, while the cladding surrounding the cores is made of the electro-optic crystal having a lower refractive index $n_2$. In an interferometric-based switch, two coupled waveguides 110 and 120 separate along paths 130 and 140 so that they are spaced from each other by a sufficiently large distance that no evanescent coupling occurs between the waveguides. The optical signal splits between the two waveguides, and a portion of the signal travels through each waveguide. The waveguides are made of an electro-optic material, and the speed at which the optical signal travels through the electro-optic material in one waveguide changes in proportion to a change in an applied electric field to that waveguide created by electrodes 150 and 160. Light travels more slowly through the waveguide that has the higher refractive index, and consequently, the phase of the light traveling through that waveguide is shifted from the phase of the light traveling through the other waveguide. The waveguides subsequently approach each other within the switch and travel parallel to one another for a sufficient distance that evanescent coupling occurs between the waveguides before the optical signal is output through exit portions 170 and 180 of these waveguides. When the two light signals are recombined in the evanescently-coupled waveguides of the switch, the two light signals add together and are emitted from the exit portions of the waveguides depending on the magnitude of phase shift between the two light signals. If the phase shift is 0° or 180°, a beam of light is emitted from each waveguide, and the beams of light have equal power. If the phase shift is 90°, the beam is only transmitted from one of the waveguides, and if the phase shift is 270°, the beam is only transmitted from the other waveguide. Other values for phase shift provide two light beams from the waveguides of unequal power. Thus, in the Mach-Zehnder switch, the power of the output signals from each of the waveguides varies as the electric field applied to the electro-optic material varies. FIG. 1A illustrates a typical Mach-Zehnder switch, and FIG. 1B shows how the power of the signal from each waveguide of the switch varies as a function of the voltage used to apply an electric field to the electro-optic material.

A second type of electro-optic switch is the $\Delta\beta$ directional coupler illustrated in FIG. 2A. The $\Delta\beta$ directional coupler is usually made in an electro-optic crystal such as $LiNbO_3$ and has two waveguides comprised of cores 210 and 220 made of one electro-optic material and cladding of a second electro-optic material (the crystal). The two waveguides of the coupler are located close enough to each other that the two waveguides evanescently couple. The optical signal is inputted to an input end 230 of one of the waveguides, and the optical signal is outputted from either or both of the first output waveguide 240 (a physical continuation of the input waveguide in this switch) or the second output waveguide 250 to which the first waveguide is evanescently coupled. An applied electric field created by electrodes 260 and 270 changes the speed of light in the two waveguides (i.e. the value of $n_1$ changes), and consequently, changes the coupling length of the waveguides changes. The power of the output signals from each of the waveguides varies as the electric field applied to the electro-optic material varies. FIG. 2B shows how the power of the signal from each waveguide varies as a function of the length of the coupler varies ($L=2\pi/k$, the coupling length). It has been noted in the literature that the $\Delta\beta$ directional coupler requires a precise length in order to obtain cross-over from the input waveguide to the output waveguide to which the first waveguide is evanescently coupled. As FIG. 2B shows, the power in each waveguide follows a periodic function, and it is necessary to fabricate the switch to precise dimensions to obtain peak power of the optical signal in one of the waveguides.

A third type of electro-optic switch places an electro-optic grating near or over one of the two output waveguides and places a strip of e.g. titanium over one waveguide to suppress power transfer from mode interference between the two waveguides. In this switch, the electro-optic grating is made of an electro-optic material that changes the coupling mode between the waveguides from even to odd in order to transmit the optical signal from an end of one or the other of the output waveguides. The power of the signal from each waveguide as a function of the length of the waveguide generally follows the curve shown in FIG. 2B.

A fourth type of electro-optic switch is the Bragg deflection grating switch. In this switch, the optical signal entering the switch is deflected between one of two waveguides at a "Y" branch by an electro-optic grating at the branching point where the input waveguide splits into the two signal carrier waveguides.

Another type of electro-optic switch is the branching waveguide switch as illustrated in FIG. 3. The branching waveguide switch is a capital-"Y"-shaped switch, where the input waveguide 310 and an expansion region 320 form the base of the "Y" and the output waveguides 330 and 340 form the arms of the "Y" that join with the expansion region at equal angles. When the switch is fabricated in $LiNbO_3$, the core "Y" structure is made of one uniform electro-optic material, and the surrounding cladding is the $LiNbO_3$ crystal (which is also an electro-optic material). One electrode 350 is formed over part of the base of the "Y" and one branch of the "Y," and the second electrode 360 is formed on the same face of the switch and over another part of the base of the "Y" and the other branch of the "Y." The input waveguide carries an optical signal that is transmitted through the expansion region and directed into the two output waveguides. When no voltage is applied, each waveguide carries equal power (assuming the switch and electrodes are each perfectly symmetric). When a positive voltage is applied, more of the optical signal is switched into one of the waveguides. When a negative voltage is applied, more of the optical signal is switched into the other of the waveguides.

A sixth type of electro-optic switch is the total internal reflection (TIR) switch, as illustrated in FIG. 4. The TIR switch is an "X" configuration, where two input waveguides 410 and 420 join with two output waveguides 430 and 440 in a common intersection 450. The core region at the intersection of the waveguides is made of an electro-optic material, and two planar electrodes 460 and 470 are formed over the electro-optic material. One of the legs of the "X" carries an input optical signal. In the absence of an applied electric field, the optical signal has nothing to deflect it, and consequently the optical signal passes straight across from one input waveguide (410, for example) of the "X," through the intersection 450, and into the output waveguide opposite the input waveguide (in this example, 440). When a sufficient electric field is established, the refractive index of the electro-optic material increases such that the electro-optic material reflects the optical signal at the intersection instead of permitting it to pass through the intersection. The electro-optic material reflects the optical signal into the adjacent output waveguide of the "X" and thus prevents the optical signal from traveling straight through the intersection.

One switch that typically does not utilize an electro-optic material to switch power to output waveguides is a multimode star coupler or multimode interference coupler illustrated in FIG. 5. In this device, incident light from a single input waveguide 510 or from multiple input waveguides 510–514 is received in a mode-mixing region 520, where multiple light signals are combined or where a single signal is expanded into one broad optical signal. The signal is transmitted into multiple waveguides 531–534 by diffracting the optical signal from the input waveguide and reflecting each portion of the split signal multiple times on the edges of the waveguides until an essentially uniform optical signal is formed which has the width of the mode-mixing region.

Switch designs based on directional couplers such as the $\Delta\beta$ reversed directional coupler have been investigated and developed to the extent that they can be integrated in a large array (e.g. 16×16 switch fabric). However, this type of switch (as well as the Mach-Zehnder, grating-directional, Bragg deflection, and multimode star coupler switches discussed above) has many drawbacks that are inherent in its design. The switch can only produce an output having a periodic function (rather than a step function) as the electric field controlling the output is changed. The switch is also extremely sensitive to the applied voltage. Consequently, each evanescent coupler will shift the optical signal from one waveguide to another at slightly different applied voltages because of minor production or operational variations in each waveguide, and consequently a switch produced today will switch optical signals from one waveguide to the next at a slightly different voltage from a switch that is produced a month from today.

A digital electro-optic switch was proposed by Silberberg et al. and constructed (Y. Silberberg, P. Perlmutter, & J. E. Baran, "Digital Optical Switch," Appl. Phys. Lett., Vol. 51, No. 16, pp. 1230–32 (Oct. 19, 1987)). This switch provides low sensitivity to deviations in manufacture and operation of the switch for both switching states, but this switch requires long device lengths and high switching voltages. In order to overcome these shortfalls, a new type of hybrid digital electro-optic switch has been developed.

SUMMARY OF THE INVENTION

The invention provides a new hybrid digital electro-optic switch that switches an optical input signal from one waveguide into another when an electric field is applied to the switch. The hybrid digital electro-optic switch of this invention utilizes an electro-optic material selectively within regions of the coupler in conjunction with passive materials to provide e.g. evanescently coupled waveguides.

The hybrid digital electro-optic switch of this invention is a waveguide switch with at least two different materials in cladding regions, or as cores, or both. One of the materials is an electro-optic material that changes refractive index in the presence of an electric field. A second of the materials is either an electro-optic material that changes refractive index less than the first material in the same electric field, or a second of the materials is a passive material that experiences little or no change in its refractive index in the presence of an electric field. Thus, for example, two cores may be made from two different materials, or two cladding regions may be made from two different materials, one material being an electro-optic material and one material being a passive material. The power of the optical signal exiting each output waveguide is varied by applying an electric field to the switch.

In one embodiment, the invention provides a hybrid electro-optic evanescently-coupled switch having a number m of waveguides (m being an integer greater than or equal to 2, with m=2 illustrated in FIG. 6) which, in cross-section along the optical path, comprises three sections, a lower section 610, a middle section 620, and an upper section 630. Each section has a first, second, third, fourth, and fifth region. The regions are each formed of a material having a refractive index sufficient that the second and fourth regions of the middle section (622 and 624, respectively) are cores and the first, third, and fifth regions (621, 623, and 625, respectively) are cladding under light transmitting conditions. The second and fourth middle regions are also spaced sufficiently closely that the second and fourth regions evanescently couple when light is transmitted into at least one of the second and fourth regions. The second middle region 622 is adjacent to the second lower region 612, the second upper region 632, and the first and third middle regions (621 and 623, respectively), and the fourth middle region 624 is adjacent to the fourth lower region 614, the fourth upper region 634, and the third and fifth middle regions (623 and 625, respectively). At least one of the regions is formed of an electro-optic material such that at least one of the following conditions is satisfied:

1. when the second or fourth lower region is formed of an electro-optic material, the other of the second or fourth lower region is formed of a passive material;
2. when the second or fourth upper region is formed of an electro-optic material, the other of the second or fourth upper region is formed of a passive material;
3. when the first, third, or fifth middle region is formed of an electro-optic material, at least one of the other of the first, third, or fifth middle region is formed of a passive material; and
4. when the second or fourth middle region is formed of an electro-optic material, the other of the second or fourth middle region is formed of a passive material, and the region formed of the electro-optic material abuts an output waveguide.

A second electro-optic material may be substituted for a passive material in the hybrid electro-optic evanescently-coupled switch described above. The second electro-optic material experiences a change in refractive index that is less than the change in refractive index of the first electro-optic material specified above when the materials are placed in an electric field.

A hybrid digital electro-optic switch of this invention can have a large number of waveguides within the switch to conduct one or more optical signals over alternate paths, or a hybrid digital electro-optic switch of this invention can have a number of switches in parallel and/or in series. The hybrid digital electro-optic switch of this invention can also use multiple materials having different refractive indices with change of voltage to transfer the optical signal into some waveguides but not others for a given voltage. The use of different electro-optic and passive materials to construct cores and cladding in a hybrid digital electro-optic switch of this invention provides a wide range of designs and switching properties that can be made for various applications.

Because of their hybrid construction, various embodiments of the hybrid digital electro-optic switch of this invention have distinct advantages over previous electro-optic switches. A hybrid digital electro-optic switch can be made which is less sensitive to voltage fluctuations, providing predictable and controllable switching of an optical signal from one waveguide to another. The refractive indices of the waveguide and cladding materials, the dimensions of the waveguides and cladding, and the coupling length of the switch can be selected so that the hybrid digital electro-optic switch saturates in the on or off state, e.g., application of additional voltage to the electrodes does not change the output optical power and crosstalk of the switch. This is distinctly opposed to the operation of an interferometric device, which requires a precise switching voltage. A hybrid digital electro-optic switch can also be made very small, an advantage not shared by the earlier design of Silberberg et al. A hybrid digital electro-optic switch can be constructed using materials that have large electro-optic coefficients and high loss of optical power, but surprisingly the hybrid digital electro-optic switch does not suffer a significant loss of optical power conducted through the switch. A hybrid electro-optic evanescently-coupled switch can also have a low switching voltage and a sharp optical power transfer from one waveguide to its adjacent waveguide. These advantages and others are apparent from the discussion herein.

BRIEF DESCRIPTION OF THE DRAWINGS

The invention, together with its various features and advantages, can be readily understood from the following more detailed description taken in conjunction with the accompanying drawings and in which the figures are schematic and have not been drawn to scale in the interest of clarity.

FIG. 15B shows how the optical power varies with the length of the waveguide in the absence of an applied electric field when an optical signal is input to the center waveguide.

FIG. 16A illustrates a hybrid $\Delta\beta$ coupler wherein one core is made of an electro-optic material and another core is made of a passive material, and FIG. 16B illustrates a hybrid $\Delta\beta$ coupler wherein the cladding comprises both an electro-optic and passive material.

17A illustrates a switch wherein part of the expanding portion of the waveguide is made of an electro-optic material and the other part of the expanding portion is made of a passive material, and FIG. 17B illustrates a switch wherein the cladding comprises both an electro-optic and passive material.

FIG. 18 shows a switch wherein a small section of the core material at the intersection of the waveguides is made of e.g. an electro-optic core material and remaining core material is made of a passive core material.

FIG. 19A illustrates that the cores of the output waveguides may be made of different materials, and FIG. 19B illustrates that the mode-mixing region may be made of at least two different materials.

DETAILED DESCRIPTION OF THE PREFERRED EMBODIMENT

The hybrid digital electro-optic switch of this invention is a switch which has at least two different materials in cladding regions, or as cores, or both. One of the materials is an electro-optic material that changes refractive index in the presence of an electric field. A second of the materials is either an electro-optic material that changes refractive index less than the first material in the same electric field, or a second of the materials is a passive material that experiences little or no change in its refractive index in the presence of an electric field. Thus, for example, two cores may be made from two different materials, or two cladding regions may be made from two different materials, one material being an electro-optic material and one material being a passive material.

There are a number of preferred embodiments of the invention. For example, many hybrid digital electro-optic evanescently-coupled switch designs are made possible by the invention. The invention can also be applied to delta beta couplers, to multimode star couplers, to branching waveguides switches, to internal reflection switches, and even to Mach-Zehnder interferometric switches. These switches are discussed below to illustrate various embodiments of the invention.

Hybrid Electro-optic Evanescently-coupled Switch

Figure 6:
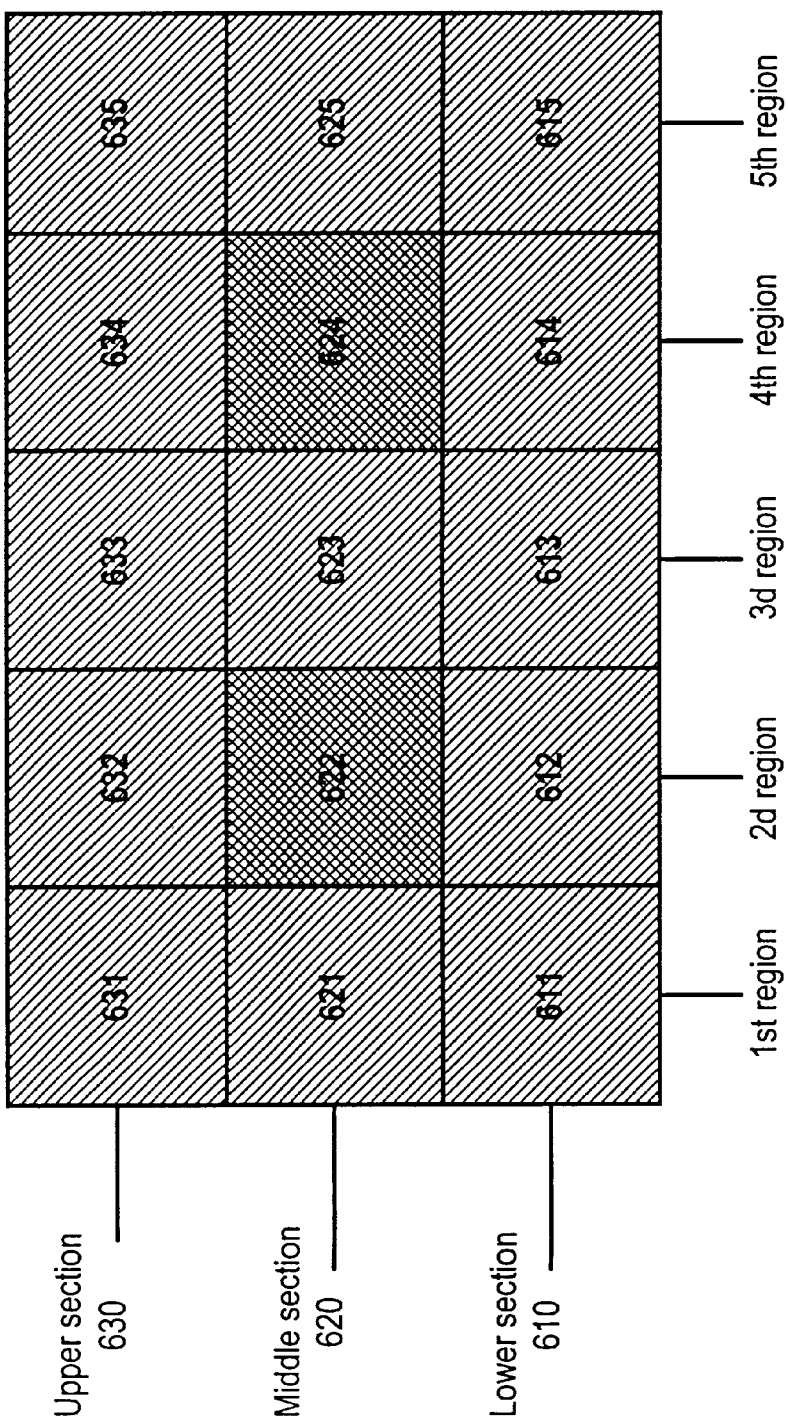
FIG. 6 is a cross-sectional view of an electro-optic coupler, illustrating the three sections and five regions of each section in the switch.

Generally, a hybrid electro-optic evanescently-coupled switch of this invention has a number m of evanescently-coupled waveguides that are sandwiched between optional electric-field-generating electrodes (m being an integer greater than or equal to two). The hybrid electro-optic evanescently-coupled switch can be viewed in cross-section along the optical path as having at least three sections, as illustrated in FIG. 6: a middle section 620 containing at least two cores 622 and 624 in core regions and cladding 621, 623, and 625 in cladding regions adjacent to the waveguides; a lower section 610 that typically contains cladding in regions that affect the evanescent coupling of the waveguides; and an upper section 630 that also typically contains cladding in regions that affect the evanescent coupling of the waveguides (usually a position immediately adjacent to the waveguides). At least one of the materials used in the core or cladding regions is a first electro-optic material that changes refractive index when an electric field generated by the electrodes is applied to the switch, and at least one of the other materials in the same section contains a respective core or cladding material that changes refractive index less in response to the applied electric field than the first electro-optic material. Thus, for example, one portion of the core of a first waveguide in the switch may be formed from an electro-optic material which abuts an output core of an output waveguide made of passive materials, and another waveguide evanescently coupled to the first waveguide may be formed from passive materials. Likewise, a cladding region in the upper section, for example 632, that affects the evanescent coupling of the waveguides can be formed from a first electro-optic material that experiences a change in refractive index of e.g. 0.010, and another region in the upper section that affects the evanescent coupling of the waveguides (e.g. 634) can be formed from a second electro-optic material that experiences a change in refractive index of e.g. 0.005 when an electric field is applied to the switch.

The optical signal introduced into one of the waveguides of the switch has an electric field component of the optical field that extends into the surrounding cladding and into the coupled waveguide. Usually, the power of the optical signal varies in each waveguide of the switch in a periodic manner due to evanescent coupling. Thus, although the optical signal is split among and substantially confined to the coupled waveguides, the electric field and power of each optical signal in each waveguide extend into the cladding and into adjacent waveguides. The optical signal can exit one or more of the waveguides at the switch's exit, depending on the length of the switch, the dimensions and proximity of the waveguides, the refractive indices of the waveguides and cladding areas, and other factors well-known in the design of digital electro-optic switches.

When the electric field generated by the electrodes is applied to the switch, the refractive index of the electro-optic material changes. This change in refractive index affects the electric field of the optical signal closest to the electro-optic material. The change in electric field of the optical signal thus changes the optical signal itself, and since waveguides are evanescently coupled, all optical signals in the evanescently-coupled waveguides of the switch are simultaneously changed by the change in refractive index of the electro-optic material. The change in refractive index can thus cause the optical power that exits each output waveguide to differ from the power exiting each output waveguide when no electric field is applied to the electro-optic material. Consequently, a change in electric field can be used to distribute a desired amount of the optical signal from the input waveguide to any or each of the output waveguides. A few illustrative embodiments of the hybrid electro-optic evanescently-coupled switch of this invention are described below.

Figure 7:
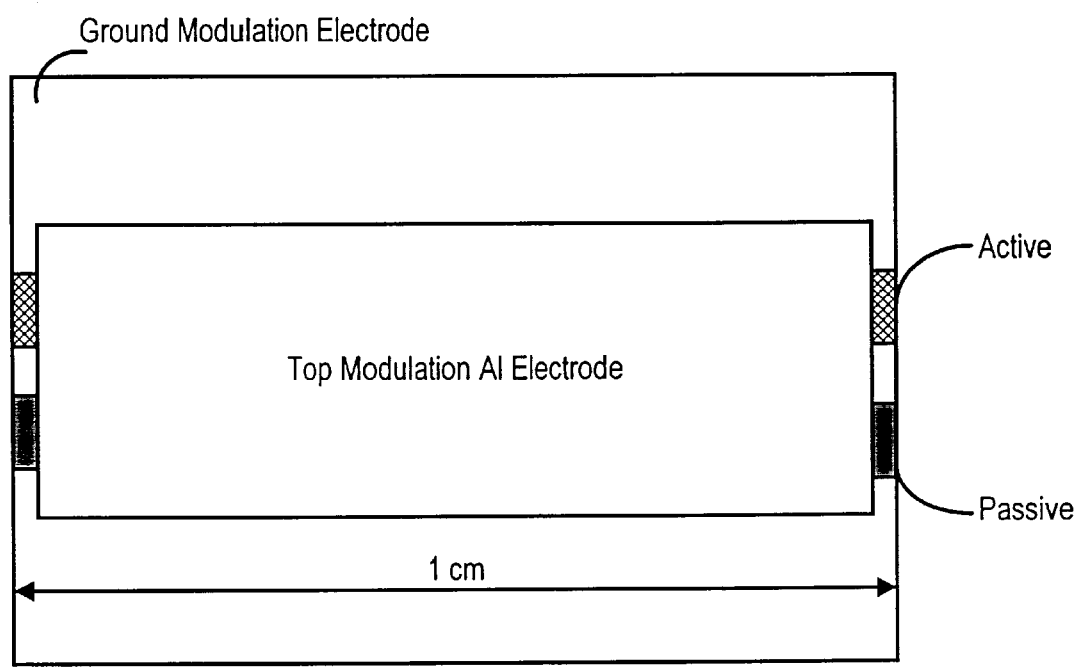
FIG. 7 is a top view of a hybrid electro-optic evanescently-coupled switch of this invention.
Figure 8:
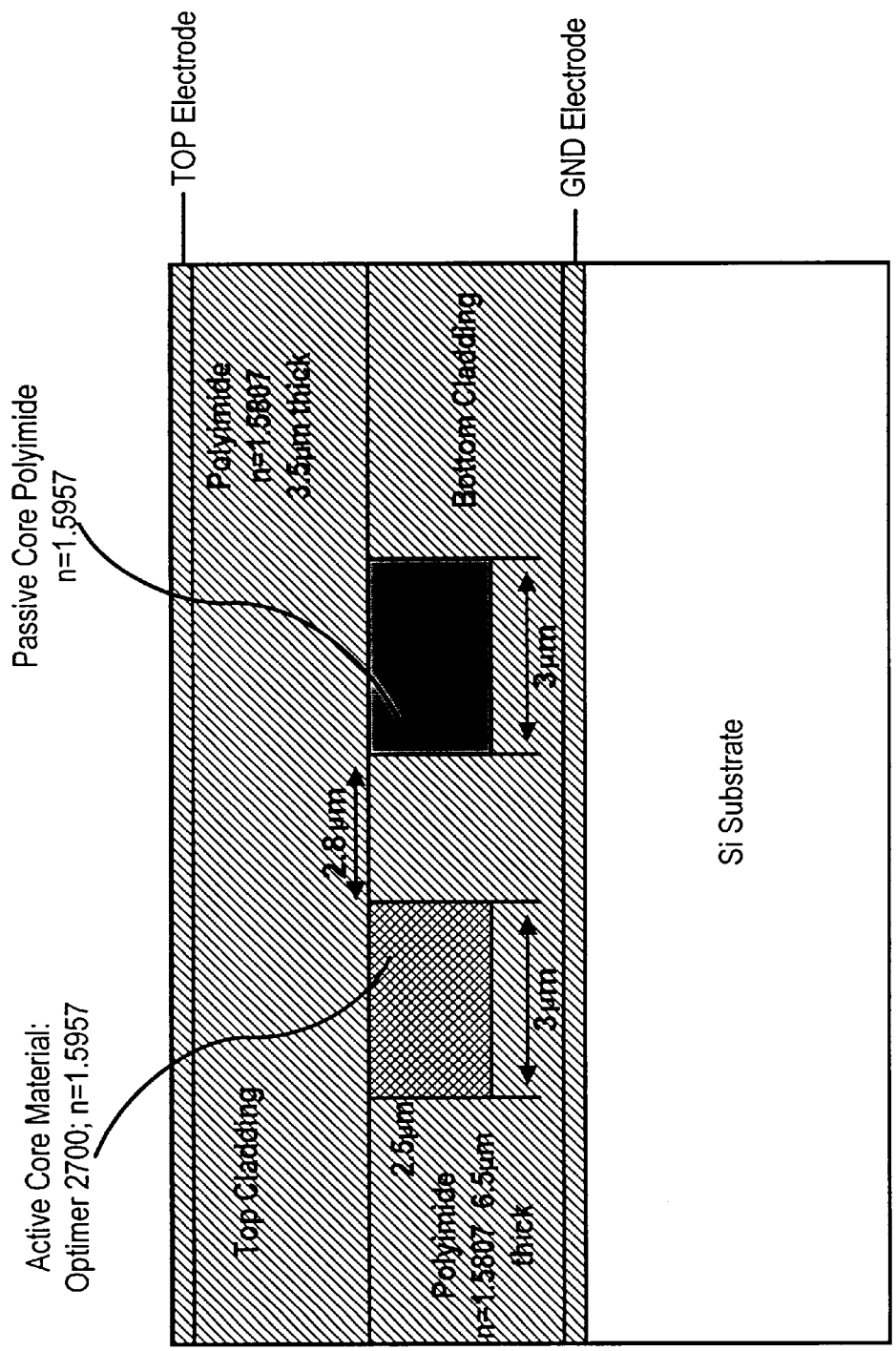
FIG. 8 is a cross-sectional view of the hybrid electro-optic evanescently-coupled switch of FIG. 7. The refractive indices given in this Figure are only for TM polarized light.

In one embodiment of the invention illustrated in FIGS. 7 and 8, the hybrid electro-optic evanescently-coupled switch has upper and lower sections of a passive cladding material and a middle section having two coupled waveguides, where each waveguide is made of a core material in a channel and a cladding material which separates the waveguides from one another. The cladding material is a passive material, that is, a material that exhibits little or no change in its refractive index with an applied electric field. One of the cores is also a passive material, but its refractive index is greater than the refractive index of the cladding. The second core is made of an electro-optic material, that is, a material that exhibits a change in its refractive index with an applied electric field. The second core has a refractive index that differs from the refractive index of the first core and that is greater than the refractive index of the cladding. The change in refractive index when the switch is subjected to an electric field is sufficient to affect the evanescent coupling between the waveguides and cause a change in the distribution of the optical signal at the ends of the waveguides.

One configuration of the hybrid electro-optic evanescently-coupled switch illustrated in FIGS. 7 and 8 was fabricated and tested to demonstrate its digital switching characteristics. The switch was made by forming trenches in a base cladding material and filling the trenches or channels so formed with either an electro-optic core material or a passive core material to form waveguides on the base material. First, an aluminum ground electrode was formed on an oxide layer on a silicon substrate to allow polymer poling and to allow modulation of the electro-optic material in the finished switch. Next, a 6.5 $\mu$m thick film of an optical grade passive polyimide (n=1.5807) was cast and cured on the Si substrate to form the base material, in this case, the bottom cladding layer. To form the cores, coplanar, parallel channels were cut into the cured polyimide film 2.5 $\mu$m deep and 3 $\mu$m wide, and optical grade passive polyimide (n=1.5957) was spun into the channels and cured. Next, identical channels were cut into the film 2.89 $\mu$m from and parallel to the channels containing passive polyimide, and electro-optic optimer 2700 available from Enichem was spun into the channels and cured. After forming the cores, a 3.5 $\mu$m layer of polyimide that was used to form the bottom cladding was spun onto the substrate and cured, and a top planar electrode was subsequently formed over the channels. The sample was heated at 260° C. and corona poled to align nonlinear molecules. As FIGS. 7 and 8 show, only one of the cores was filled with electro-optic material, and the electro-optic material abutted an output waveguide made of passive materials. The coupling length of this switch was 1 cm. The top and bottom cladding layers isolate the waveguide mode from the modulation electrodes. The polymer materials used in this device are high thermal stability optical grade polyimides. The cladding and passive core materials have glass transition temperatures ($T_g$) above 350° C., and the electro-optic core material has a $T_g$ of approximately 250° C.

The above hybrid electro-optic evanescently-coupled switch functions by applying a voltage to the electrodes, creating an electric field which both changes the resonance coupling between the waveguides and changes the overlap interval of the optical modes of the evanescently-coupled waveguides. The change in refractive index of the electro-optic material changes the evanescent coupling between the waveguides, leading to a change in the transfer of the optical signal from one waveguide to the other waveguide. Curve 1 in FIG. 9 shows the switching characteristics of the hybrid digital electro-optic switch illustrated in FIGS. 7 and 8, where the input optical signal had an operating wavelength of 0.83 $\mu$m.

When the device described above and illustrated in FIGS. 7 and 8 is modulated by an applied voltage, the applied electric field changes the refractive index of the core containing the electro-optic material. The modulated index ($\Delta n_{modulation}$) can be calculated from the relationship ($\Delta n_{modulation}$)=(0.5 n³rV/d), where n in this equation is the effective refractive index of the guide mode of the single mode channel waveguide, r is the electro-optic coefficient, V is the applied voltage, and d is the distance between the top and bottom modulation electrodes (the device thickness). Because this switch was designed to have a 1 cm long coupling length without applied voltage, this switch can switch the input optical signal even with a very small modulated index ($\Delta n \sim 5 \times 10^{-5}$). The modulation depth was greater than 37 dB, which provides very good electrical isolation and little cross-talk. Although there was a small (<15%) oscillation after the first peak in Curve 1 of FIG. 9, this "ringing" of the output signal power can be eliminated by using Marcatili's method to design the switch and through an appropriate choice of polymers or other electro-optic and passive materials, dimensions and separation of waveguides, and location of electro-optic material in the hybrid switch.

Figure 9:
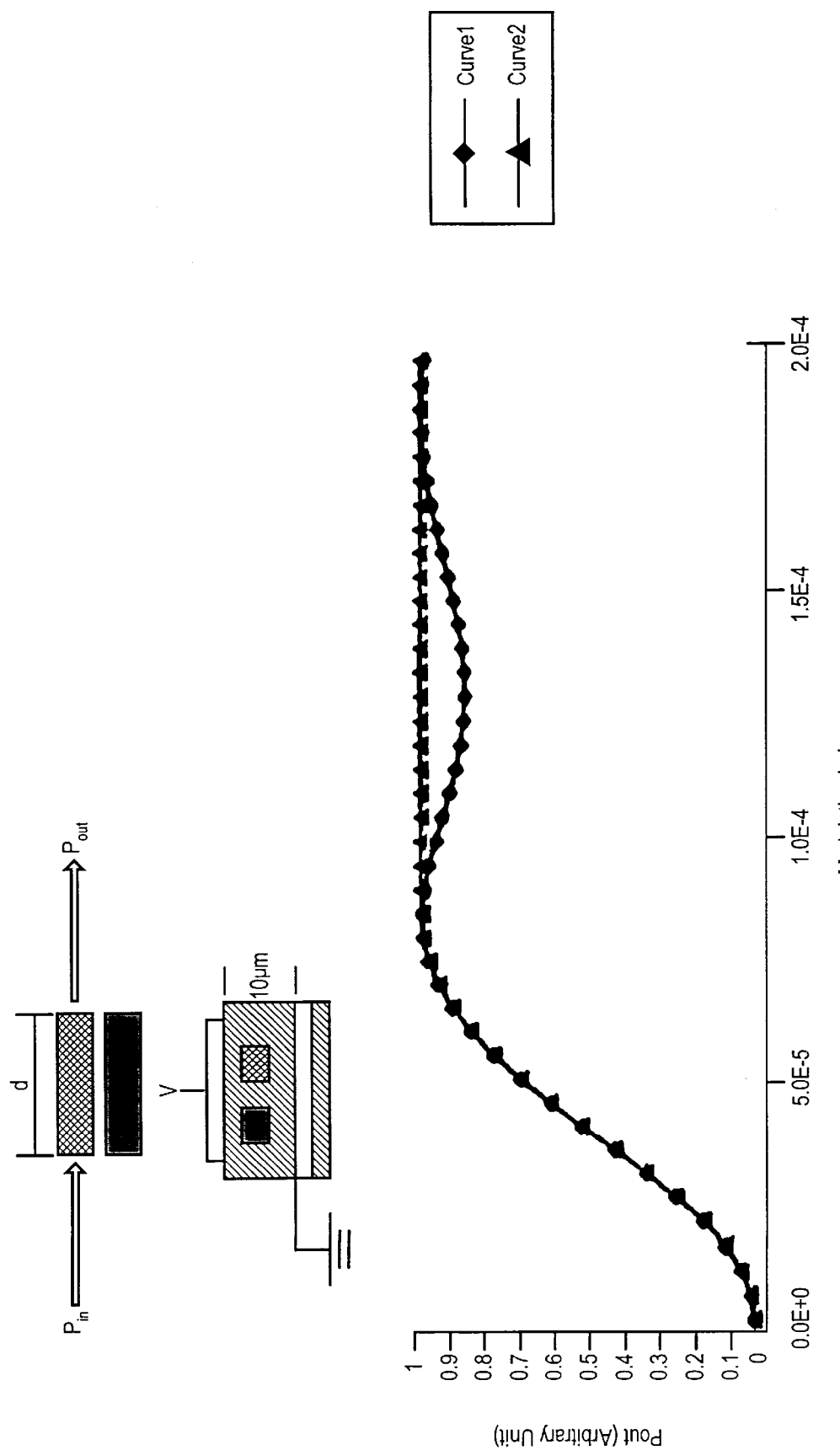
FIG. 9 shows the switching performance for the hybrid electro-optic evanescently-coupled switch of FIG. 7.
Figure 10:
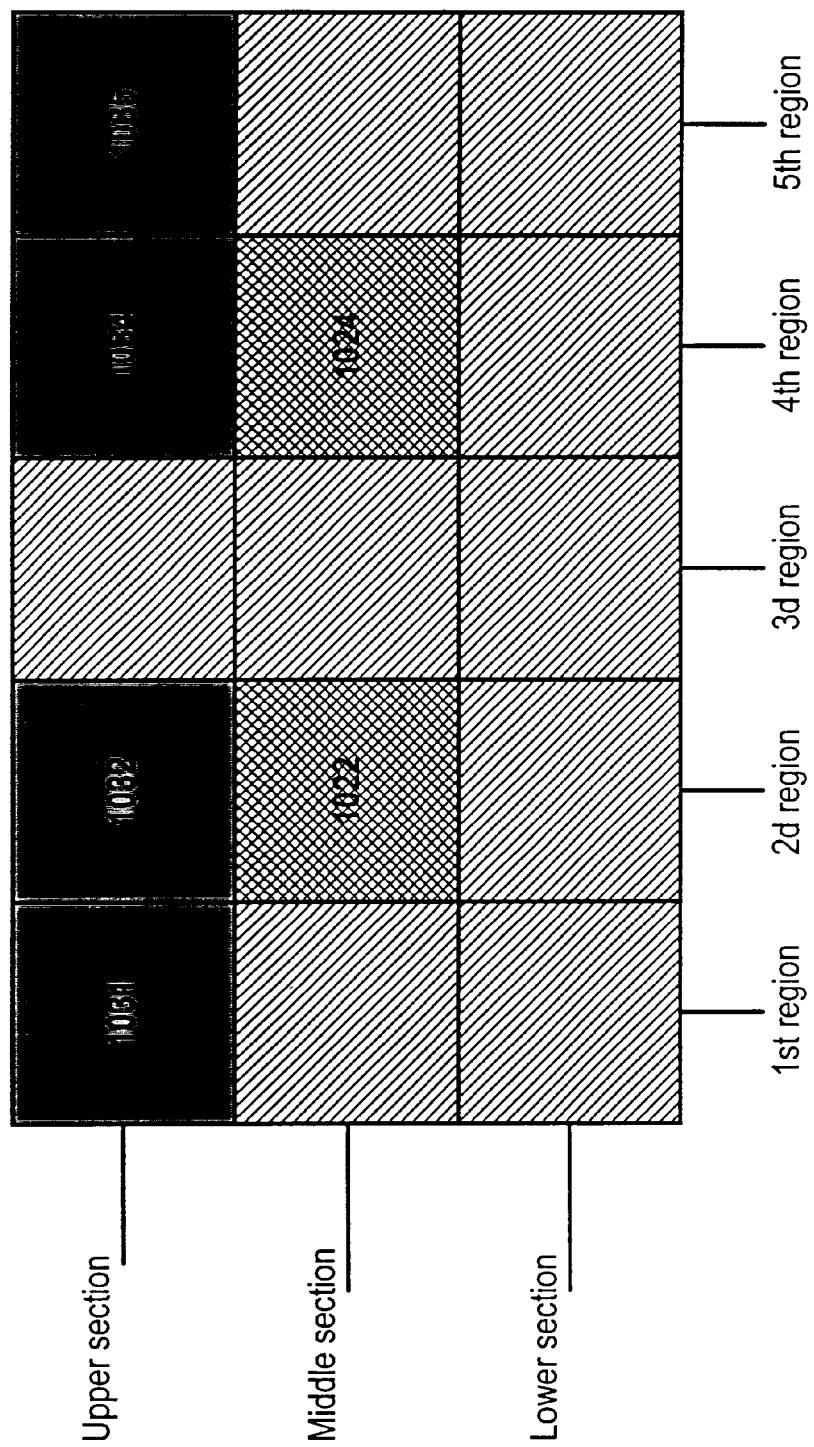
FIG. 10 is a cross-sectional view of another hybrid electro-optic evanescently-coupled switch of this invention.

Curve 2 in FIG. 9 shows the switch transfer function for such an improved design, wherein the switch has electro-optic material in the cladding instead of the waveguides as discussed later. The switch had the following design: the switch has two cores 1022 and 1024 in the middle section surrounded by cladding, as shown in FIG. 10; cores are 4 $\mu$m wide, 3 $\mu$m deep, and separated from each other by cladding 4–5 $\mu$m wide; cores are formed from a passive material having a refractive index of 1.59; electro-optic and passive cladding have a refractive index of 1.58 in the absence of an applied electric field; the electro-optic cladding experiences a change in refractive index of about 0.008 to 0.01 in the presence of the electric field; electro-optic cladding is located in regions 1031, 1032, 1034, and 1035 of the upper section; and the remaining cladding is formed from passive material. The hybrid digital electro-optic switch described above provides an example of how a switch of this invention can saturate with an applied voltage (i.e. instead of each waveguide carrying evanescently-coupled optical power in a periodic fashion, the waveguides saturate, and one waveguide carries the optical signal and the other waveguide carries none of the optical signal).

Figure 11:
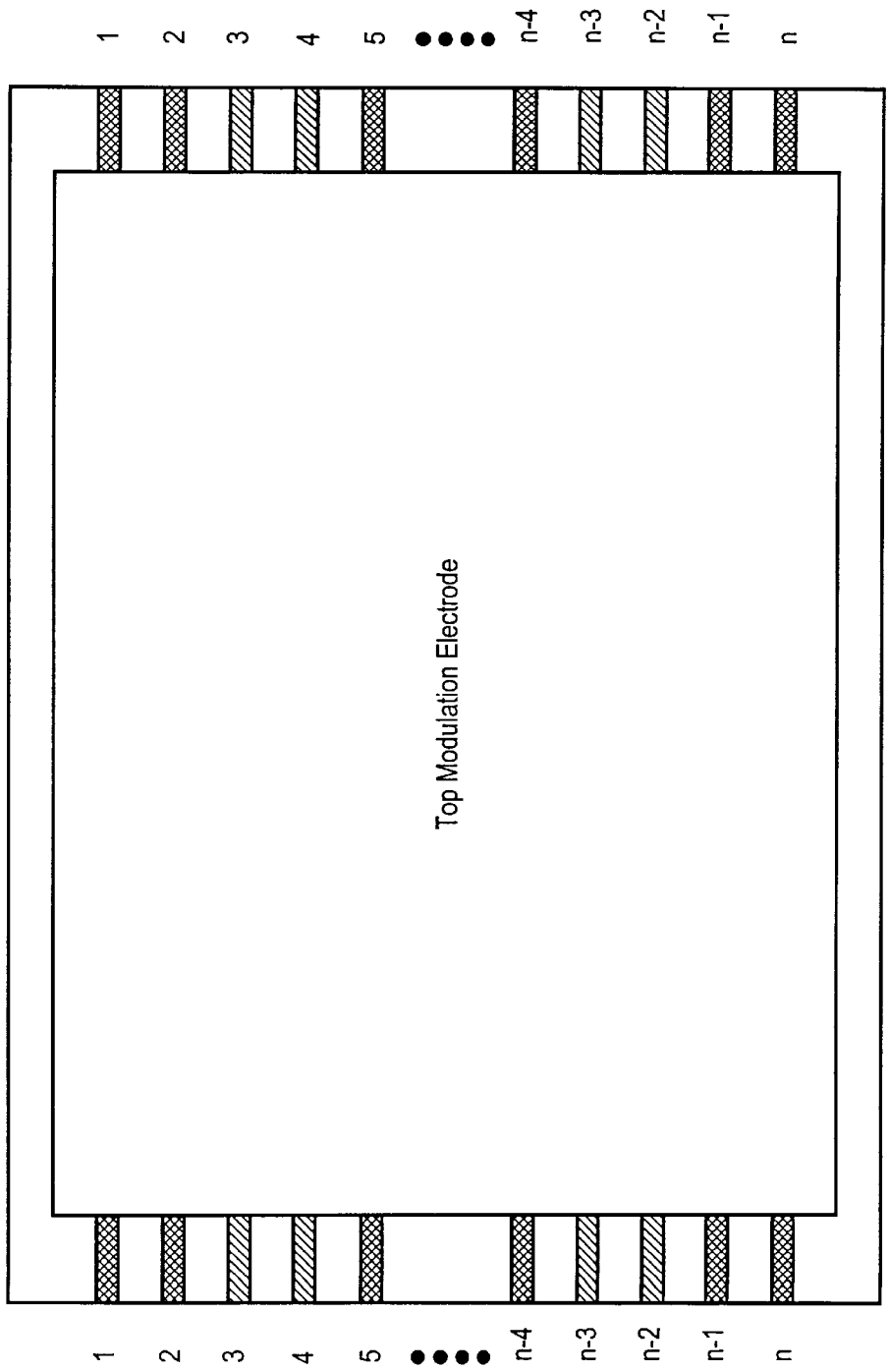
FIG. 11 is a top view of a hybrid electro-optic evanescently-coupled switch formed of n coupled channel waveguides. The waveguides are sandwiched between two modulation electrodes.
Figure 12:
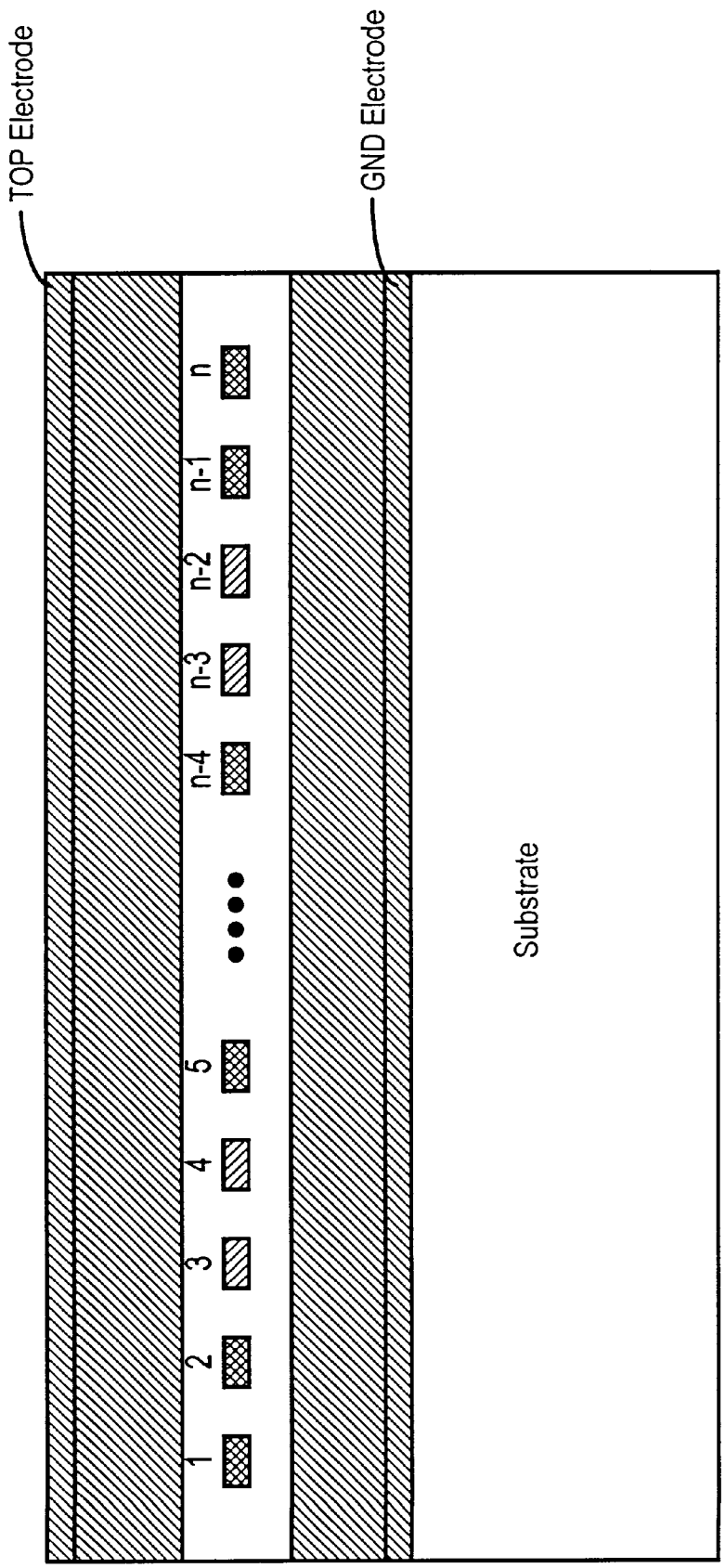
FIG. 12 is a cross-sectional view of the switch of FIG. 11, a trench-and-fill hybrid digital electro-optic switch. The trenches cut into the base material are filled selectively with at least two different materials, each of which responds differently to an applied electric field, to form the hybrid structure.

FIGS. 11 and 12 illustrate a hybrid electro-optic evanescently-coupled switch having n evanescently-coupled waveguides. The middle section contains the n coupled cores that are separated from one another by cladding regions and that are separated from the modulation electrodes by upper and lower cladding layers. Cores 1, 2, 5, n-4, n-1, and n, for example, are made of electro-optic core material, and the other cores are a passive material. Each electrode is sized and configured to provide essentially the same electric field to each of the waveguides. Planar or strip electrodes can be used. The advantage of sandwiching the waveguides between the top and bottom electrodes as illustrated instead of placing electrodes adjacent one another in the same plane (as is necessary in many conventional switches) is to obtain essentially 100% overlap efficiency between the optical and modulating electric fields. All the waveguides are single mode optical waveguides. Although there are n waveguides both at the input and output ends, only one laser beam is supplied to one of the n inputs at any given moment. Depending on the applied voltages and the location of and materials used for the electro-optic and passive waveguides in the switch, the optical power transmitted at each of the n outputs can be varied and, thus, a switch can be designed for specialized applications.

Figure 13:
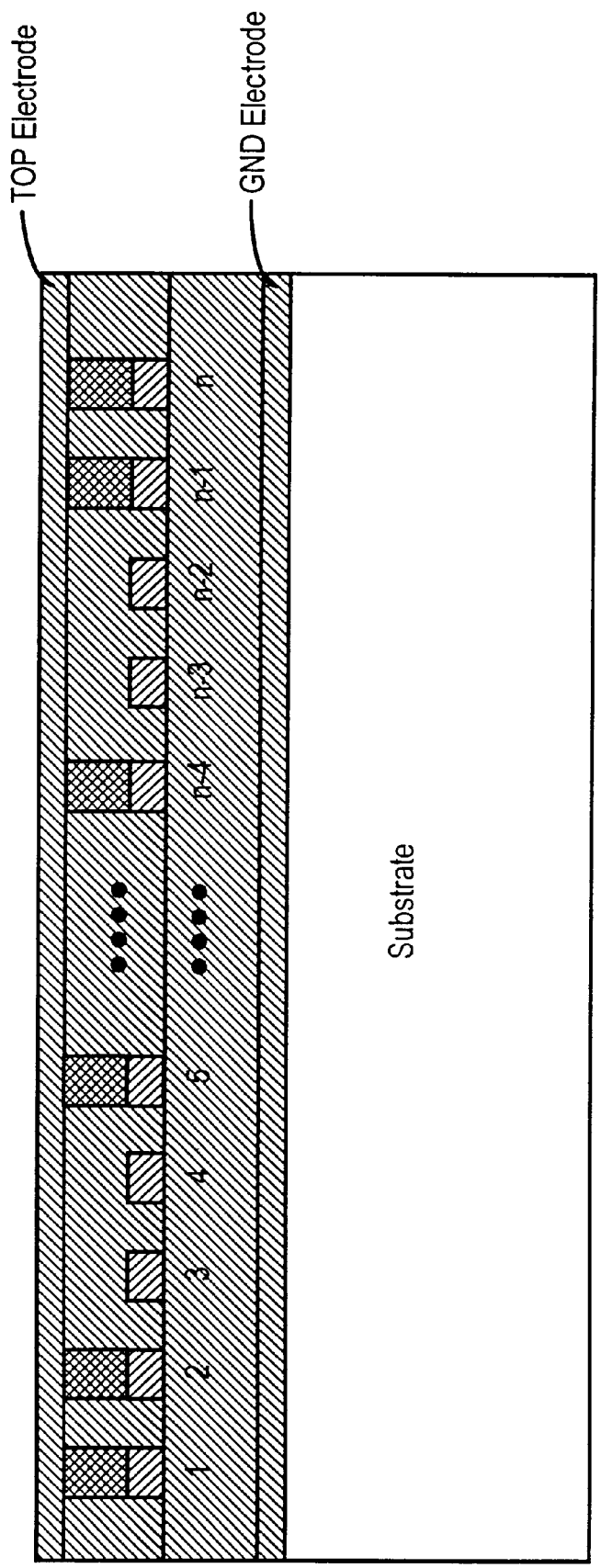
FIG. 13 is a cross-sectional view of a rib-type hybrid electro-optic evanescently-coupled switch. In this structure, electro-optic material is selectively layered above certain core channels, and other cladding material is layered above other of the core channels.

FIG. 13 is a cross-sectional view of a hybrid electro-optic evanescently-coupled switch having rib waveguides. In this particular embodiment, the n cores are formed of a passive material. The upper section has regions above cores 1, 2, 5, n-4, n-1, and n, for example, of electro-optic cladding material, and the other cores are covered with regions of passive cladding material. The cores in this figure are separated from one another by passive cladding regions.

Figure 14:
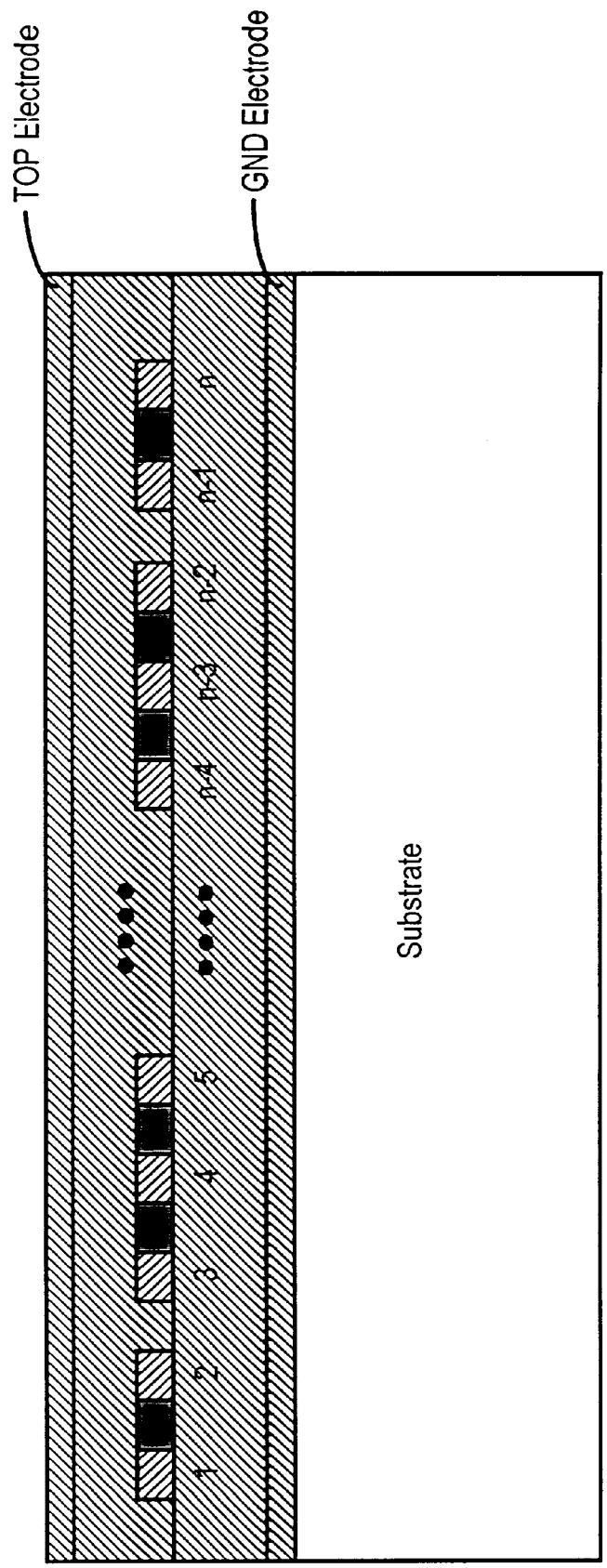
FIG. 14 is a cross-sectional view of another type of hybrid electro-optic evanescently-coupled switch. In this case, electro-optic material fills the cladding region between selected waveguide channels, and passive material fills the remaining cladding regions.

FIG. 14 is a cross-sectional view of another hybrid electro-optic evanescently-coupled switch having rib waveguides. In this switch, the cladding regions between core regions 1 and 2, 3 and 4, 4 and 5, n-4 and n-3, n-3 and n-2, and n-1 and n are filled with electro-optic material, and the remaining cladding regions between core regions are filled with passive material.

The hybrid electro-optic evanescently-coupled switches illustrated in FIGS. 13 and 14 can utilize electro-optic materials which, if used in current switches, would dissipate much of the energy of the optical signal. A digital electro-optic switch which utilizes only electro-optic material in its cores can lose much of the input optical signal through the switch. Many electro-optic materials that have a large change in refractive index in the presence of an applied electric field are "lossy" materials, i.e., the materials dissipate a significant amount of the optical energy transmitted through those materials. Thus, cores made of such "lossy" materials reduce the energy of the optical signal substantially as the signal travels through those waveguides, and much of the optical signal is lost. The designs of FIGS. 13 and 14 utilize a material having a high loss within cladding regions instead of within cores. Electro-optic material in cladding regions near the cores change the overlap interval of the optical modes of the evanescently-coupled waveguides. Since the optical-quality passive material of the cores (which causes little dissipation of the optical signal) carries the majority of the optical signal, the switches of FIGS. 13 and 14 lose little of the energy in the optical signal, despite using a material having high energy loss in the switch. A switch of this design can carry less than 1% of the optical power of the signal in the high-loss electro-optic cladding region. Thus, when using electro-optic materials of high loss (e.g. approx. 20 dB/cm) in the cladding region, the switch can have little loss of optical signal strength (e.g. approx. 1 dB/cm).

The hybrid digital electro-optic switches illustrated in FIGS. 13 and 14 can also use the same passive material in the cores, which allows the β value of the two waveguides to be matched. Matched β values provide the capability to switch 100% of the energy of the optical signal from one waveguide to the other, whereas unequal β values permit only a portion of the optical energy to be switched to a coupled waveguide. The β values desired for each waveguide are determined by the choice of refractive index of core and cladding and dimensions of the waveguide as known in the art.

Figure 15A:
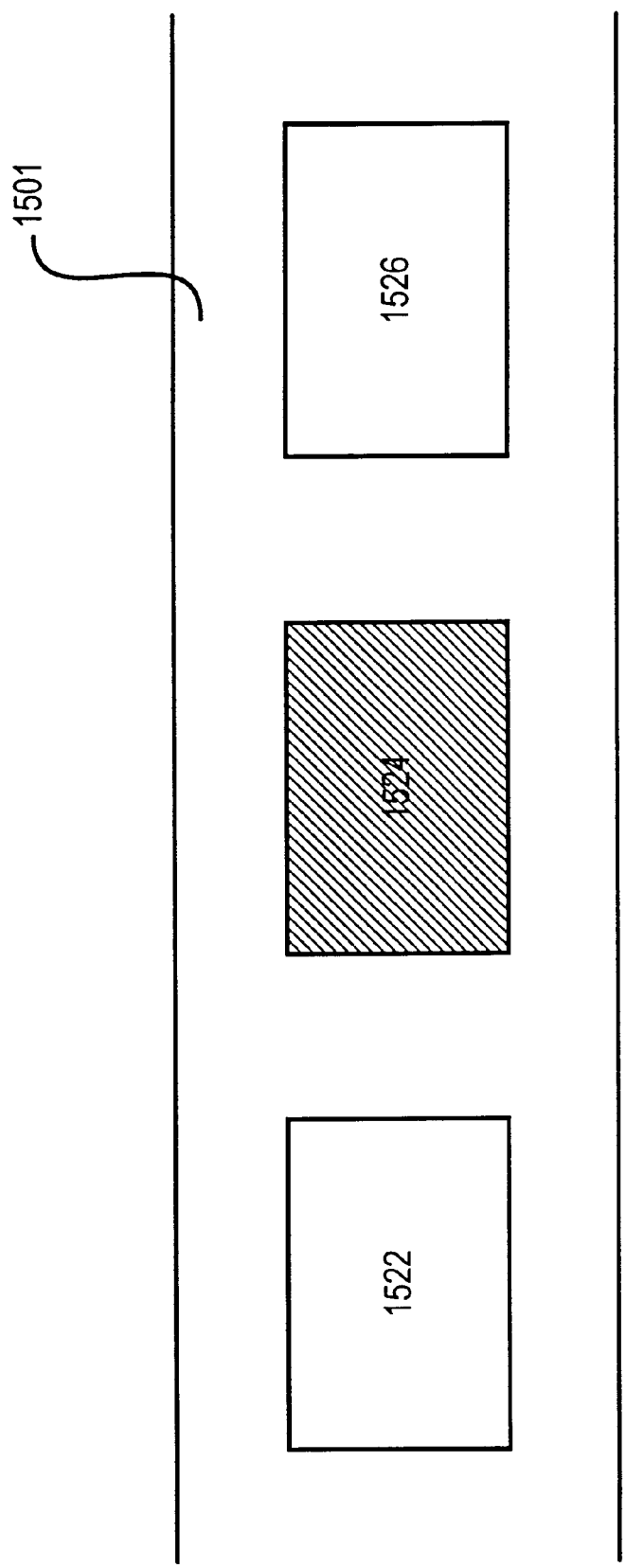
FIG. 15A is an end view of a hybrid electro-optic evanescently-coupled switch having three waveguides.

Another hybrid electro-optic evanescently-coupled switch is illustrated in FIG. 15A. The middle section of the switch has three evanescently-coupled cores. The outer cores 1522 and 1526 are formed from the same passive material, and the inner core 1524 is formed from an electro-optic material. The cladding regions adjacent to the cores in the lower, middle, and upper sections contain the same passive material 1501 and have a refractive index that is less than the refractive index of the cores. The middle core receives the input optical signal, and the power varies in a periodic manner along the length of the waveguides as shown in FIG. 15B. This embodiment illustrates that a hybrid digital electro-optic switch can be designed to be less sensitive to voltage variations by selecting the number of waveguides and the dimensions of the switch such that the optical power is split between waveguides when the power exits the waveguides. This design provides power peaks in the outer waveguides that are more rounded than a design where all of the optical power exits one waveguide. The rounded peaks make the switch less sensitive to device length and/or to voltage fluctuations than previous switches. In fact, the power can be distributed to any combination of waveguides in the array by making the core and/or cladding regions from electro-optic material or materials and passive material or materials and applying an electric field to alter the overlap interval of optical signals in adjacent waveguides, thereby affecting the power distribution of the optical signal in each of the waveguides.

Figure 22:
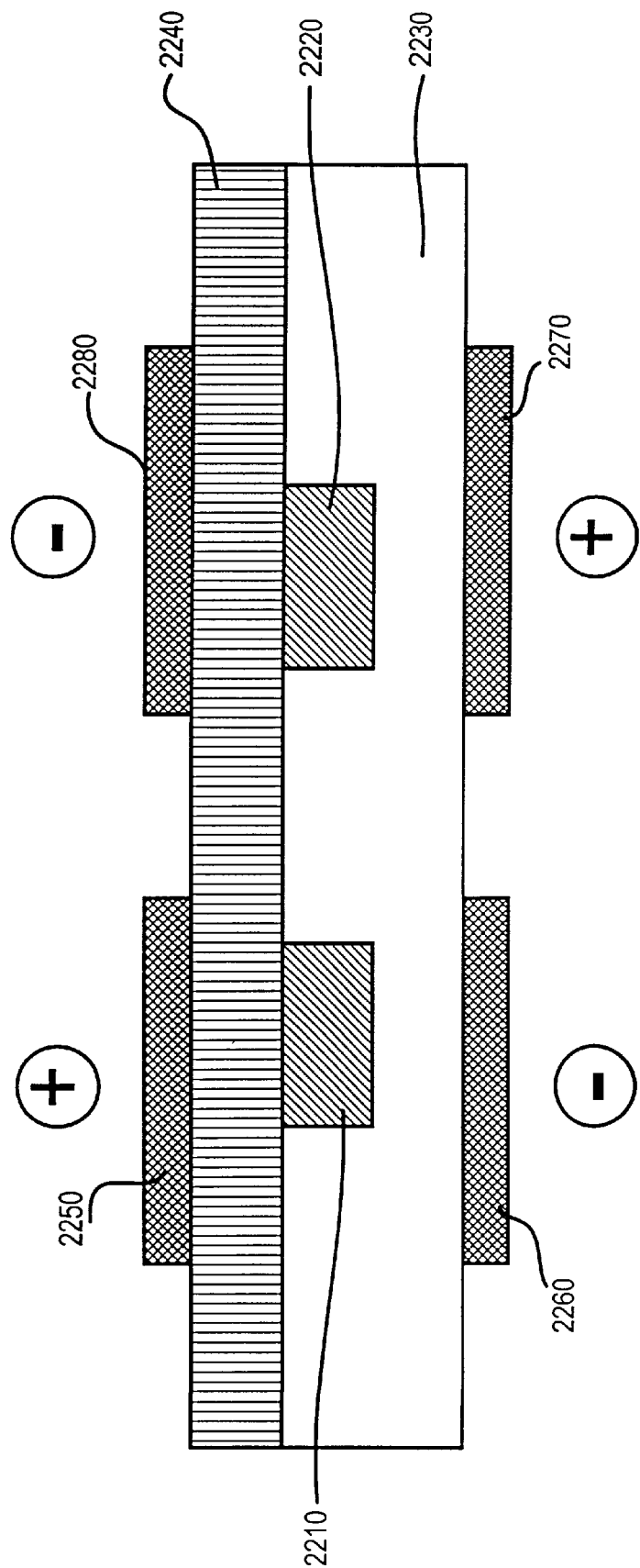
FIG. 22 illustrates a hybrid electro-optic switch having cores made of passive core material, a cladding layer made of electro-optic material, and two sets of electrodes.

Another hybrid electro-optic evanescently-coupled switch is illustrated in FIG. 22. This switch has two cores 2210 and 2220 made of a passive core material. The cladding 2230 below, between, and to the sides of the cores is a passive cladding material. The cladding 2240 over the cores is an electro-optic cladding material. There are two sets of electrodes in this switch. The first set of electrodes, 2250 and 2260, are respectively located above and below core 2210, and the second set of electrodes, 2270 and 2280, are respectively located below and above core 2220. The electro-optic cladding material is one in which the refractive index of a region of the material is sensitive to the direction of the electric field passing through the region. For example, electro-optic cladding material 2240 has a refractive index $n_0$ in the absence of an applied electric field. If the direction of the electric field is in the direction from electrode 2250 to electrode 2260, the refractive index of that region affected by the electric field generated by these electrodes is $n_1$, where $n_1$ is greater than $n_0$. If the direction of the electric field is in the direction from electrode 2270 to electrode 2280, the refractive index of that region affected by the electric field generated by these electrodes is $n_2$, where $n_2$ is less than $n_0$. Thus, a voltage applied to the two sets of electrodes will affect the optical signal being carried in the evanescently-coupled waveguides much more than a switch wherein the two sets of electrodes have electrode fields directed in the same direction. This design also allows different voltages to be applied to the two different sets of electrodes, permitting the performance and behavior of the switch to be changed by individually adjusting the voltage to each set of electrodes.

Other switch designs are discussed below. These switches are constructed and operate similarly to the hybrid electro-optic evanescently-coupled switches discussed above and, consequently, have the same advantages as those switches.

Hybrid Delta Beta Couplers

Figure 2A:
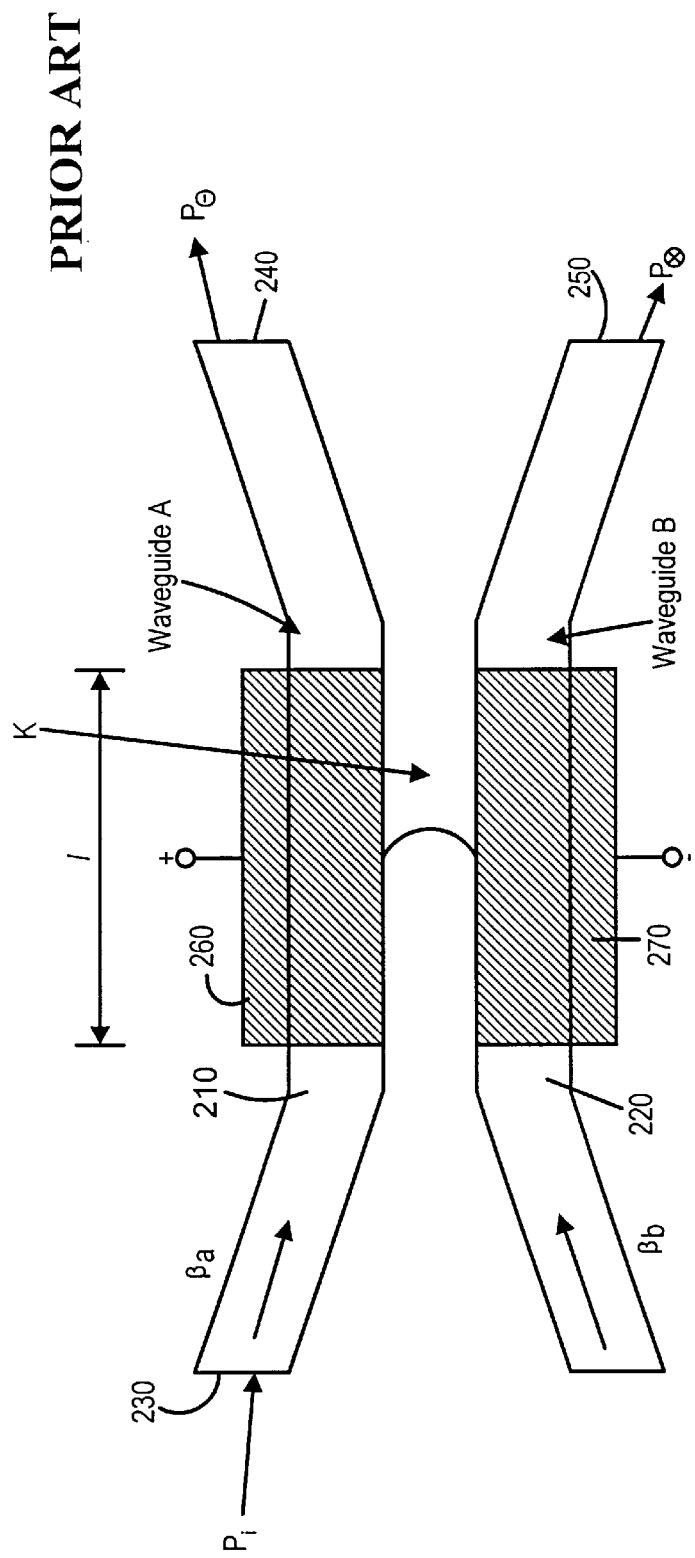
FIG. 2A shows a conventional $\Delta\beta$ directional coupler.
Figure 2B:
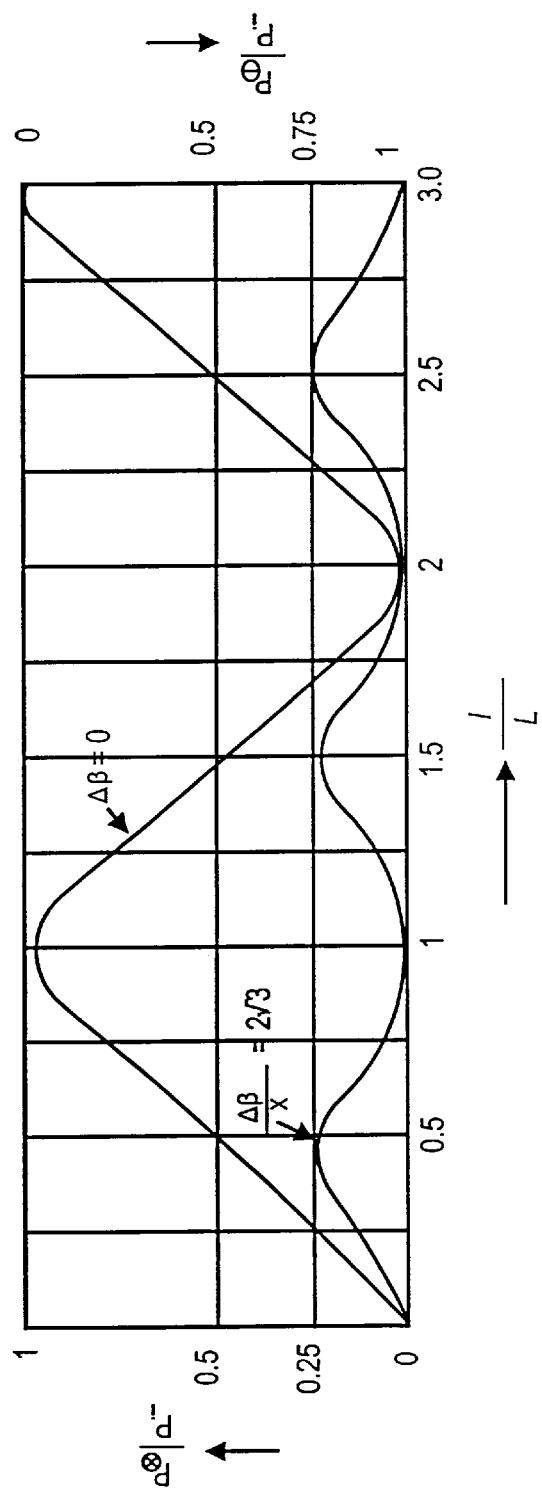
FIG. 2B shows the output power in each branch of the switch as a function of the length of the coupler.
Figure 16A:
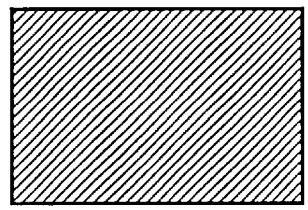
FIGS. 16A and 16B illustrate two embodiments of a hybrid delta-beta coupler of this invention.
Figure 16A:
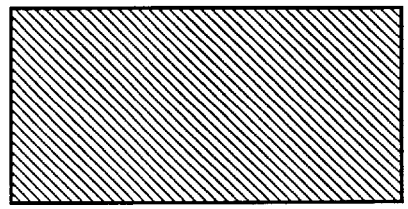
Figure 16B:
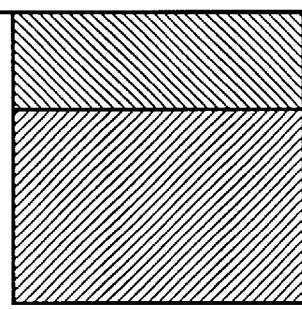
Figure 16B:
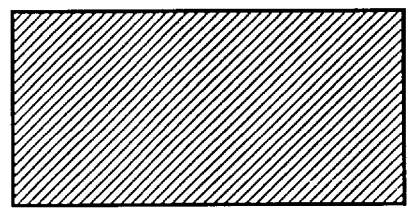

The conventional delta beta coupler illustrated in FIG. 2 uses the same electro-optic material in each of its waveguides and the same passive material in its waveguide regions. The hybrid delta β coupler of this invention uses two different materials in either the core (see FIG. 16A) or the cladding (see FIG. 16B) of the coupler. As discussed above, one core can be made using an electro-optic material, and the other core can be made of a passive material. Alternatively or additionally, one cladding section can be an electro-optic material and other cladding sections can be passive material.

Hybrid Branching Waveguide Switches

Figure 4:
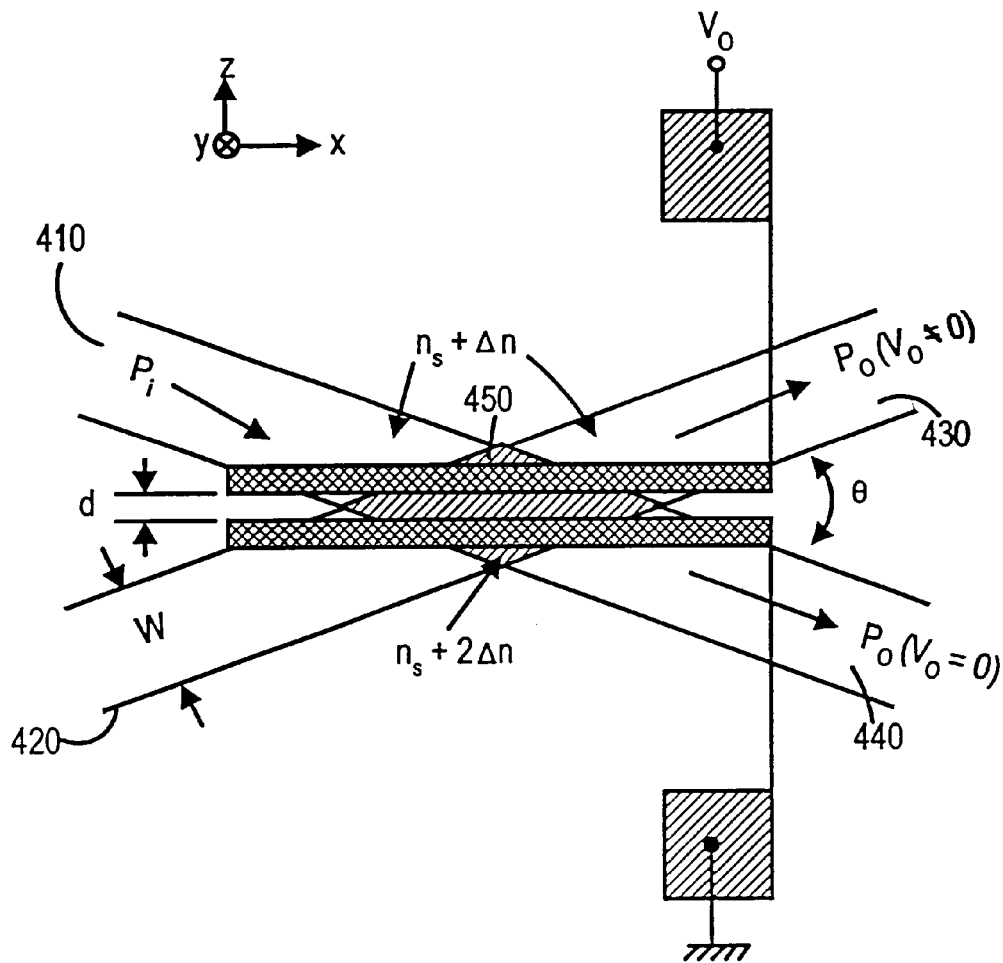
FIG. 4 shows a conventional total internal reflection switch.
Figure 17A:
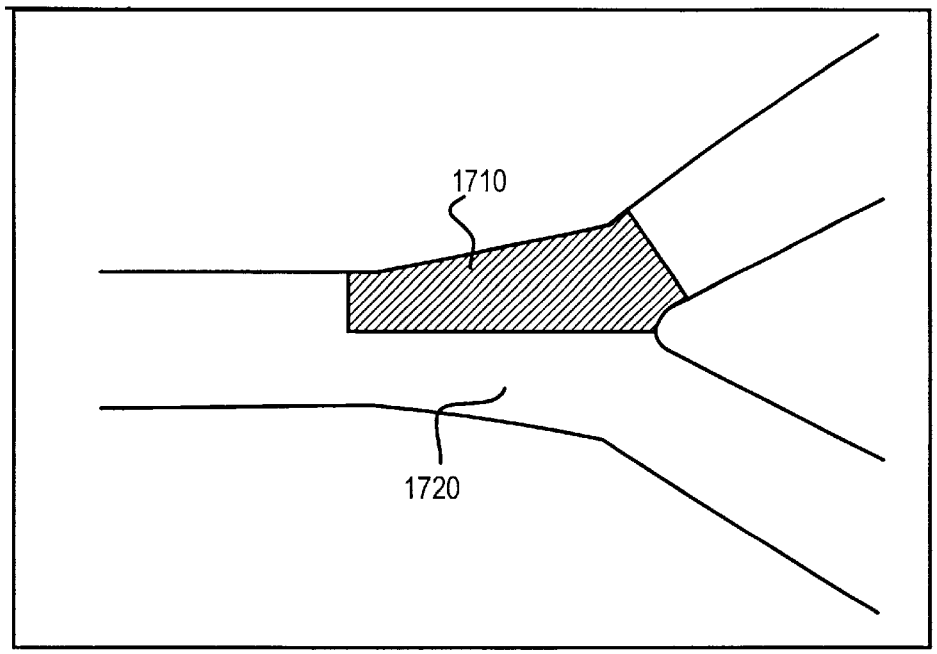
FIGS. 17A and 17B illustrate two embodiments of a hybrid branching waveguide switch of this invention. FIG.
Figure 17B:
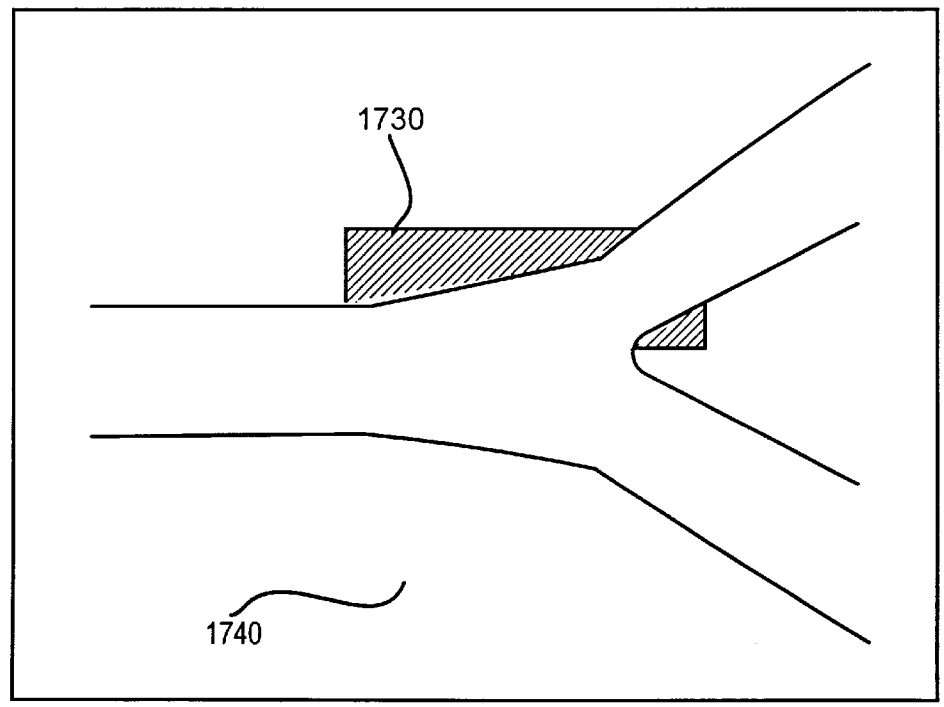

The conventional branching waveguide switch as illustrated in FIG. 4 has a core structure of one uniform electro-optic material and cladding of another uniform electro-optic material. The hybrid branching waveguide of this invention can be made in a number of ways. The expanding portion of the hybrid branching waveguide can be made of two materials, one electro-optic 1710 and one passive 1720 as shown in FIG. 17A, for example, and having equal refractive indices in e.g. the absence of an applied electric field. A change in the applied electric field causes the optical signal to be diverted to one or the other of the output waveguides. As in previous embodiments of the invention discussed above, instead of making the waveguides of an electro-optic and passive material, the cladding above, below, and/or on the sides of the expanding portion of the waveguide prior to the branching point can be made of at least two materials, an electro-optic material (as shown, for example, by feature 1730) and a passive material (feature 1740). See FIG. 17B for one such embodiment.

Hybrid Total Internal Reflection Switches

Figure 5:
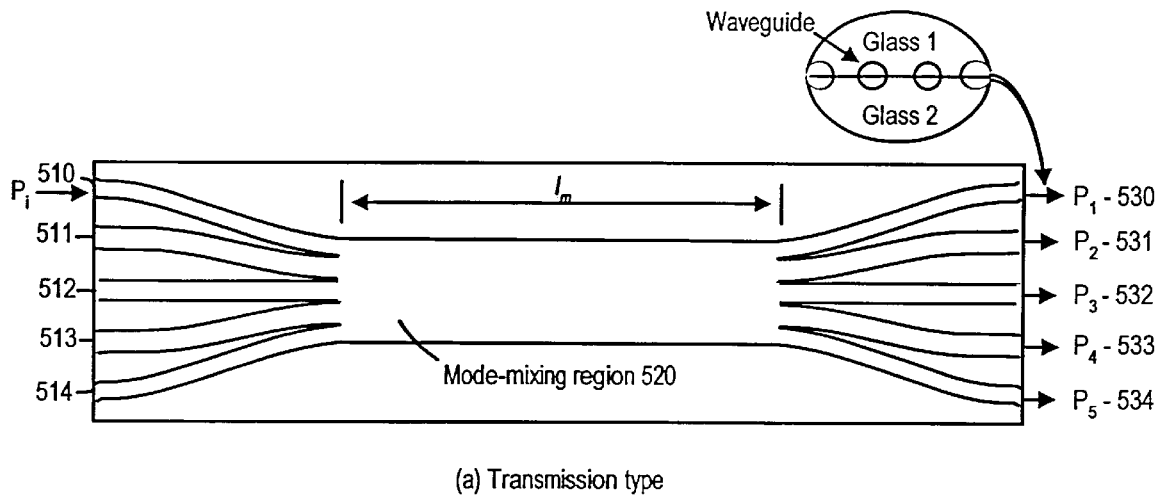
FIG. 5 shows a conventional multimode star coupler.
Figure 5:
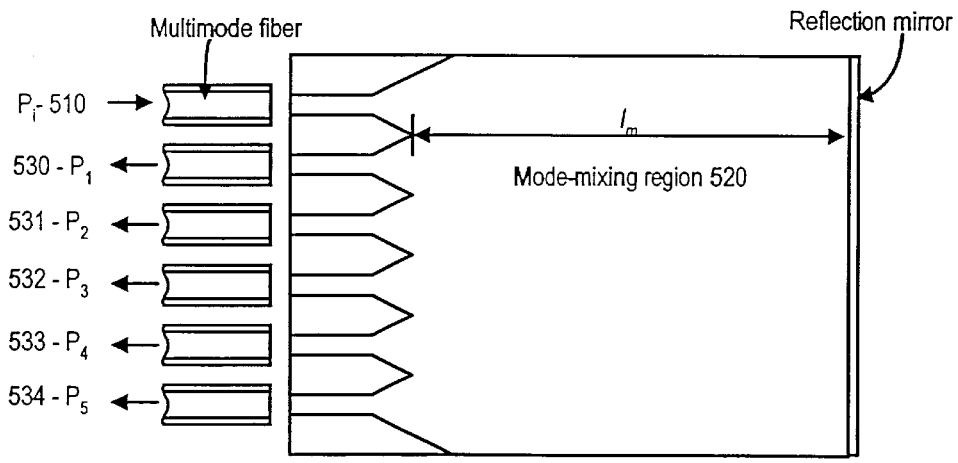

The conventional total internal reflection (TIR) switch illustrated in FIG. 5 is two waveguides that cross and are thus configured in an "X" configuration. The intersection of the two waveguides is made of an electro-optic material, and two planar electrodes are formed over the electro-optic material.

Figure 18:
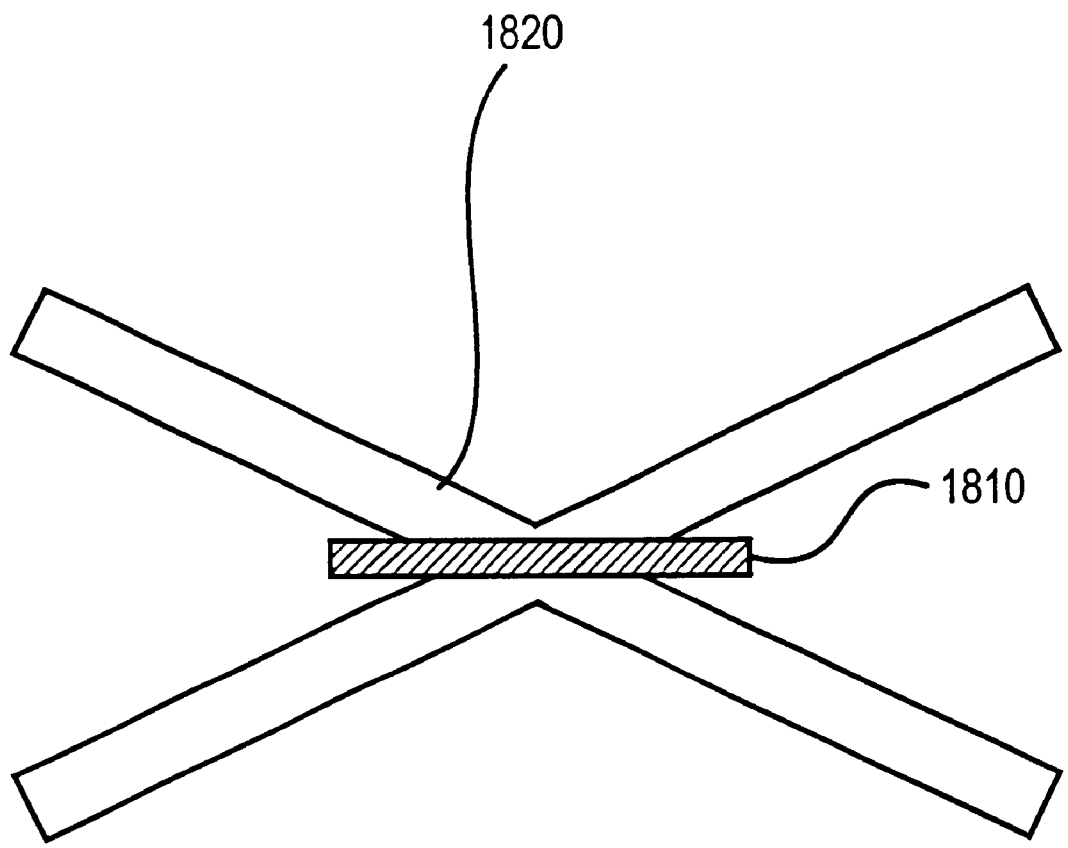
FIG. 18 illustrates a hybrid total-internal reflection switch of this invention.

In the hybrid TIR switch illustrated in FIG. 18, the core material at the intersection of the waveguides is a hybrid structure. The core material has a small section 1810 which is made of a different material from the remainder of the core material 1820 in the intersection. The small section can be an electro-optic core material, and the remainder of the intersection can be passive material, for example. Or, the small section can be passive core material, and the remainder of the section can be an electro-optic core material. The two core materials have the same value of refractive index e.g., in the absence of an electric field, and the two core materials have sufficiently different refractive indices in the presence of an applied electric field that the switch functions as a total internal reflection switch.

Hybrid Multimode Star Couplers

Figure 3:
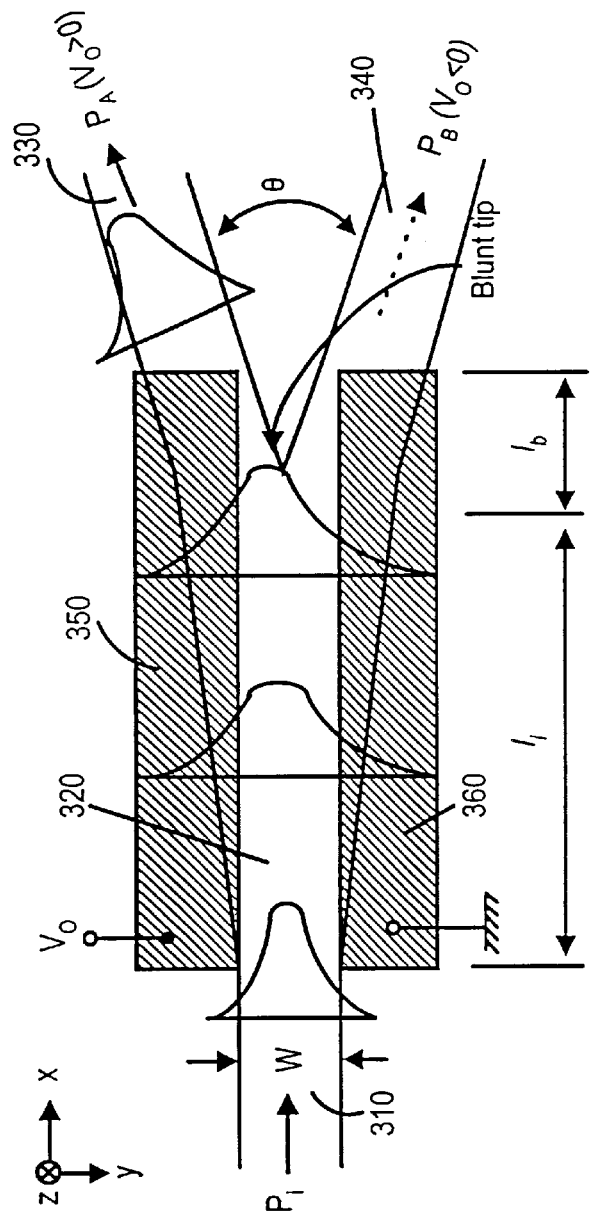
FIG. 3 illustrates a conventional branching waveguide switch.

The conventional multimode star coupler illustrated in FIG. 3 is a passive switch that does not utilize an electro-optic material. The conventional multimode star coupler receives an optical signal from a single input waveguide or from multiple input waveguides 1910 and 1920. The input optical signal or signals travel into a mode-mixing region 1930, where multiple light signals are combined and expanded or where a single signal is expanded into one broad optical signal. The signal is directed into multiple waveguides by diffracting the optical signal from the input waveguide and reflecting each portion of the split signal multiple times on the waveguide edges. In the conventional multimode star coupler, the length of the mode-mixing region is selected so that all output waveguides are excited.

Figure 19A:
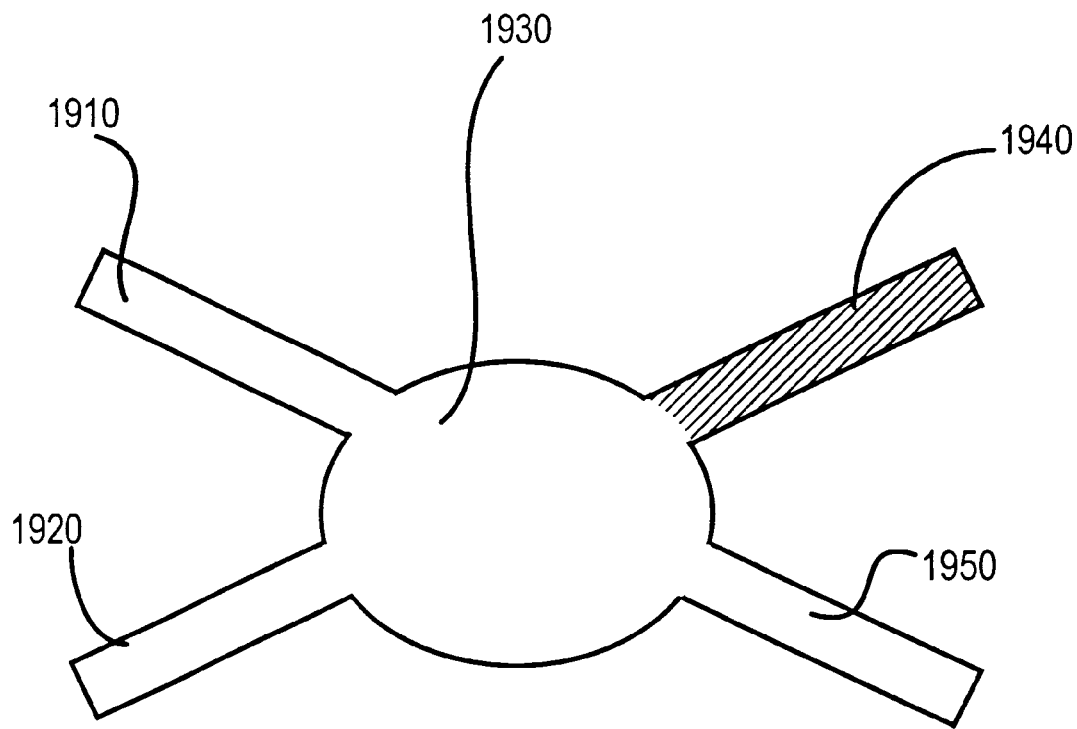
FIGS. 19A and 19B illustrate two embodiments of a hybrid multimode star coupler of this invention.

The hybrid multimode star coupler of this invention can be made a number of ways. For example, as shown in FIG. 19A, the cores 1940 and 1950 of the output waveguides may be made of different materials (e.g. one electro-optic, one passive), so that when an electric field is applied to the output waveguides, the level of power of the optical signal in the output waveguides is changed. Likewise, the cladding regions may be made of different materials, one electro-optic and one passive, to affect the power of the optical signal in each of the output waveguides.

Figure 19B:
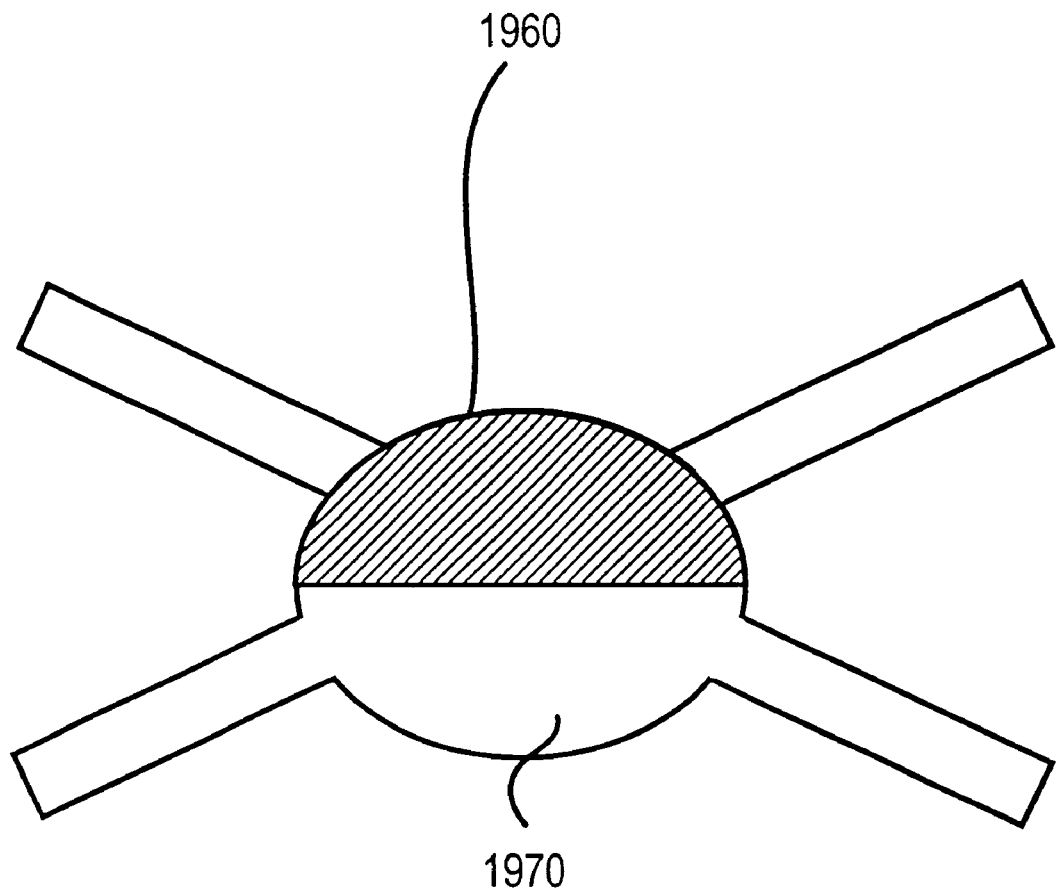

Another example of a hybrid multimode star coupler is illustrated in FIG. 19B, where the mode-mixing region is made of at least two different materials 1960 and 1970, and at least one of the materials is electro-optic (1960 in this example). For example, the simplest coupler would have one electro-optic material and one passive material in the mode-mixing region as illustrated in FIG. 19B. The two materials could have their refractive indices matched e.g. in the presence of an applied electric field. The change in the electro-optic material's refractive index with change in electric field would produce a different power distribution to the output waveguides, and thus the power of the input optical signal can be distributed into the output waveguides so that the power level in certain waveguides differs from the power in other waveguides. A similar effect can be obtained by selectively placing electro-optic material in part of the cladding above, below, and/or to the side a mode-mixing region made of a uniform passive material.

Hybrid Mach-Zehnder Interferometric Switches

Figure 1A:
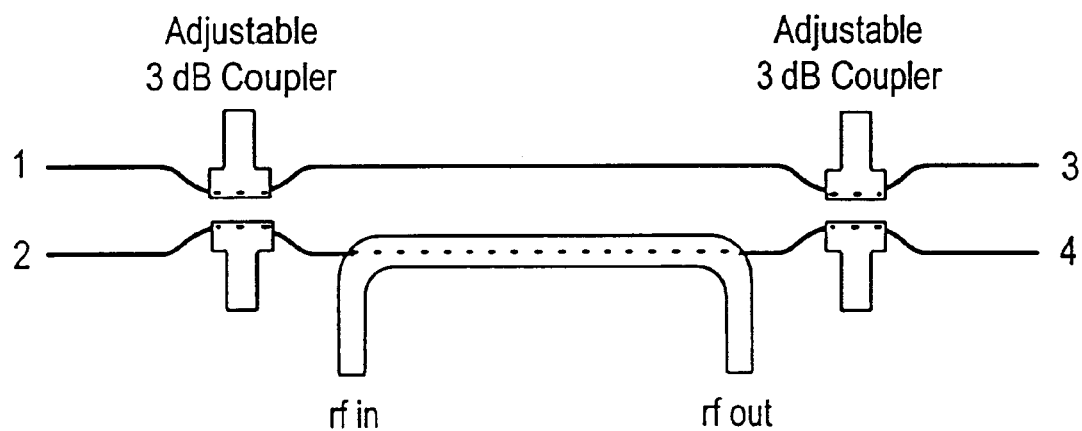
FIG. 1A illustrates a conventional interferometric-based switch, a Mach-Zehnder switch.
Figure 1B:
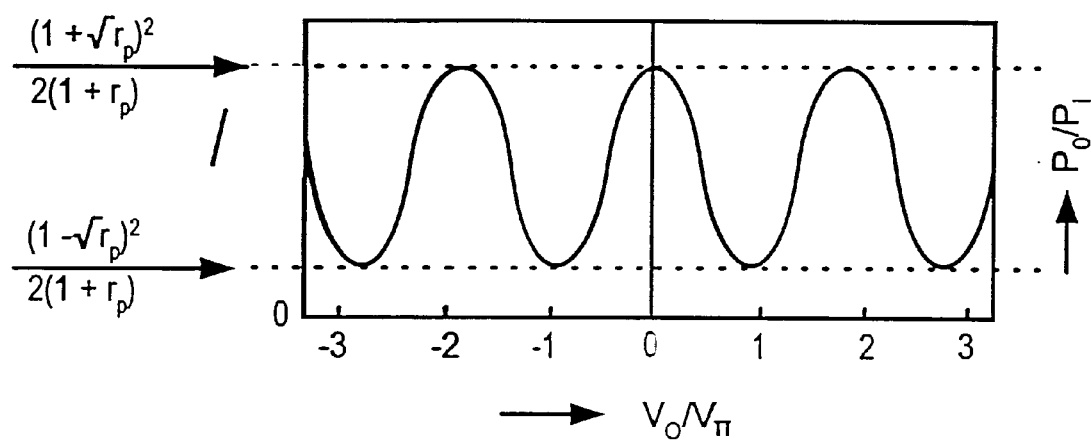
FIG. 1B shows the output power in each branch of the switch as a function of the voltage used.

In a conventional Mach-Zehnder interferometric switch as illustrated in FIG. 1A, the input waveguide splits into two separated waveguides that are spaced from each other by a sufficiently large distance that no evanescent coupling occurs between the waveguides. The optical signal splits between the two waveguides, and a portion of the signal travels through each waveguide. The waveguides subsequently approach each other within the switch and travel parallel to one another for a sufficient distance that evanescent coupling occurs between the waveguides before the optical signal is output through exit portions of these waveguides. The resulting signal in the two output waveguides is the result of the interference of one of the optical signals with the other signal.

Figure 20:
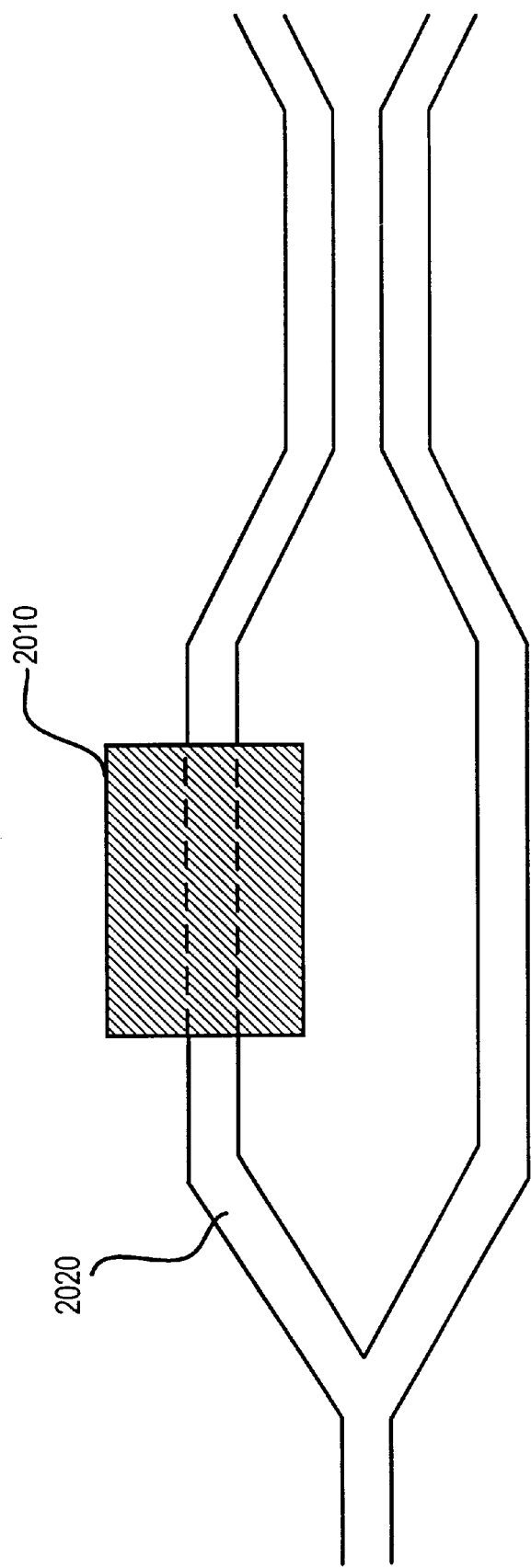
FIG. 20 illustrates a hybrid Mach-Zehnder interferometric switch of this invention, wherein the cladding above one of the cores that is not evanescently coupled to the other core is made of an electro-optic material.

In a hybrid Mach-Zehnder interferometric switch of this invention illustrated in FIG. 20, the cladding 2010 above or beside one of the cores 2020 that is not evanescently coupled is made of two materials, one an electro-optic material and the other a passive material. An electric field applied to the electro-optic material causes a phase shift of the optical signal in the nearby core without the large loss in optical signal that is associated with a conventional Mach-Zehnder switch.

Alternatively, a hybrid Mach-Zehnder interferometric switch can have one core that comprises an electro-optic material and a second core that comprises e.g. a passive material. Only a portion of one of the cores needs to be an electro-optic material. For example, a portion of one isolated branch may contain a sufficient length of electro-optic material to cause the desired phase-shift in the optical signal traveling through that waveguide. Alternatively, one of the evanescently-coupled cores may be made of an electro-optic material.

Further Discussion of the Invention

It is not necessary for a passive material to be used in conjunction with an electro-optic material. For example, the hybrid electro-optic evanescently-coupled switch of FIG. 7 can be fabricated using two different electro-optic materials in its cores, and the cladding may be a third electro-optic material. By using different electro-optic materials, the electric field of the optical signal can be changed in response to an applied electric field to provide the desired optical signal power distribution at the exit of each output waveguide.

It is not necessary to generate the electric field to which the electro-optic material is exposed with planar or strip electrodes located above and below the electro-optic material. Electrodes may be placed on either side of the electro-optic material, and multiple electrodes may be used to provide electric fields of different direction through the electro-optic material. For example, instead of using four electrodes in the switch shown in FIG. 22, three electrodes may be placed over electro-optic cladding 2240 and positioned so that a ground-potential electrode is located between cores 2210 and 2220 and positive- and negative-potential electrodes are located to either side of cores 2210 and 2220. Instead of or in addition to the electrodes, any electric field-generating equipment can be used that generates an electric field sufficiently strong to change the refractive index in an electro-optic material present in the switch. For example, wires carrying a voltage and generating an electric field into which the switch is placed can be positioned above and/or below the electro-optic material.

The hybrid digital electro-optic switch of this invention can be made by a variety of methods. The method described above is a trench-and-fill method, where the base material on e.g. a silicon substrate is trenched, and the channels so formed are filled with various materials. It is not necessary to trench and fill, however. Materials may be coated onto a substrate and selectively etched, and further coating and etching can be used to fabricate the hybrid digital electro-optic switches. Methods for making a switch of this invention are disclosed in copending U.S. Patent Application entitled "Method of Making Optical Interconnects with Hybrid Construction," inventors Edward S. Binkley and James C. Nurse, filed concurrently with this application and which is incorporated by reference in its entirety herein. Switches may alternatively be formed by doping regions of crystals or semiconductors unequally with a metal such as titanium to form electro-optic waveguide and/or cladding regions that experience a different change in refractive index in the presence of an applied electric field. Multiple quantum well devices may also be fabricated by similar methods.

Evanescently-coupled switches discussed above are based on hybrid resonant coupled mode theory, and switches of this invention can be designed and switching characteristics predicted using Maxwell's equations, Marcatili's method, or the effective index method, for example, as described in H. Nishihara et al., OPTICAL INTEGRATED CIRCUITS, pp. 29–32 and 46–61 (1985) (McGraw-Hill). Usually, the coupling length is selected during design, and the other design parameters such as material refractive index and width, depth, and separation of waveguides are chosen to provide the desired switching characteristics for the particular application in which the switch is to be used. The maximum thickness of the switch is usually established by the voltage that is available to produce the electric fields that act on the electro-optic material in the waveguide.

Evanescently-coupled switches of this invention have m waveguides, with m being an integer greater than or equal to two. Typically, m is a value between two and sixteen, although a greater number of evanescently-coupled waveguides may be present.

In various embodiments, these switches have a number of advantages over previous electro-optic or digital electro-optic switches. Hybrid digital electro-optic switches can have enhanced switching efficiency, and a lower voltage is required to the electrodes to switch the optical signal than the voltage required in previous electro-optic or digital electro-optic switches. The coupling length of the switch can be very short, resulting in small switches (on the order of 10 $\mu m \times 1$ cm). Also, because of their small size, the switches can be made at a higher density on a substrate. The coupling length can also be selected from a wide range of values (on the order of about 3 $\mu m$ to about 3 m), which allows the switch to be used with various optical input signals for many different applications. A hybrid digital electro-optic switch can produce a sharp, step-like switch of the energy of the optical signal from one waveguide to another which does not vary with increased voltage instead of producing the periodic and sinusoidal modulation that is present in current resonant couplers. This also makes the switch of this invention less sensitive to manufacturing variations, since the user can set the bias voltage for a number of switches to the highest switching voltage among the switches, assuring that all switches will switch their optical signals equally. A hybrid digital electro-optic switch can have low electrode capacitance (on the order of 1 pf) and very little optical dispersion, and the switch can have little or no jittering noise or ringing once switched (on the order of 1 ps). The optical signal can be essentially totally isolated from effects of the electric field, and consequently very high frequency signals (greater than 10 GHz) can be carried in a digital hybrid switch. There is also great flexibility in design of a hybrid digital electro-optic switch. For example, waveguides of different refractive index, width, and depth can be selected for use with one another so long as the propagation velocity of light $\beta$ is equal for each of the waveguides at the conditions selected to switch the optical signal from one waveguide to the other. Another advantage of many of the hybrid digital electro-optic switches of this invention is that the switch can carry a single-mode optical signal without adding optical modes. Thus, a single-mode optical signal is also outputted from the switch.

Figure 21A:
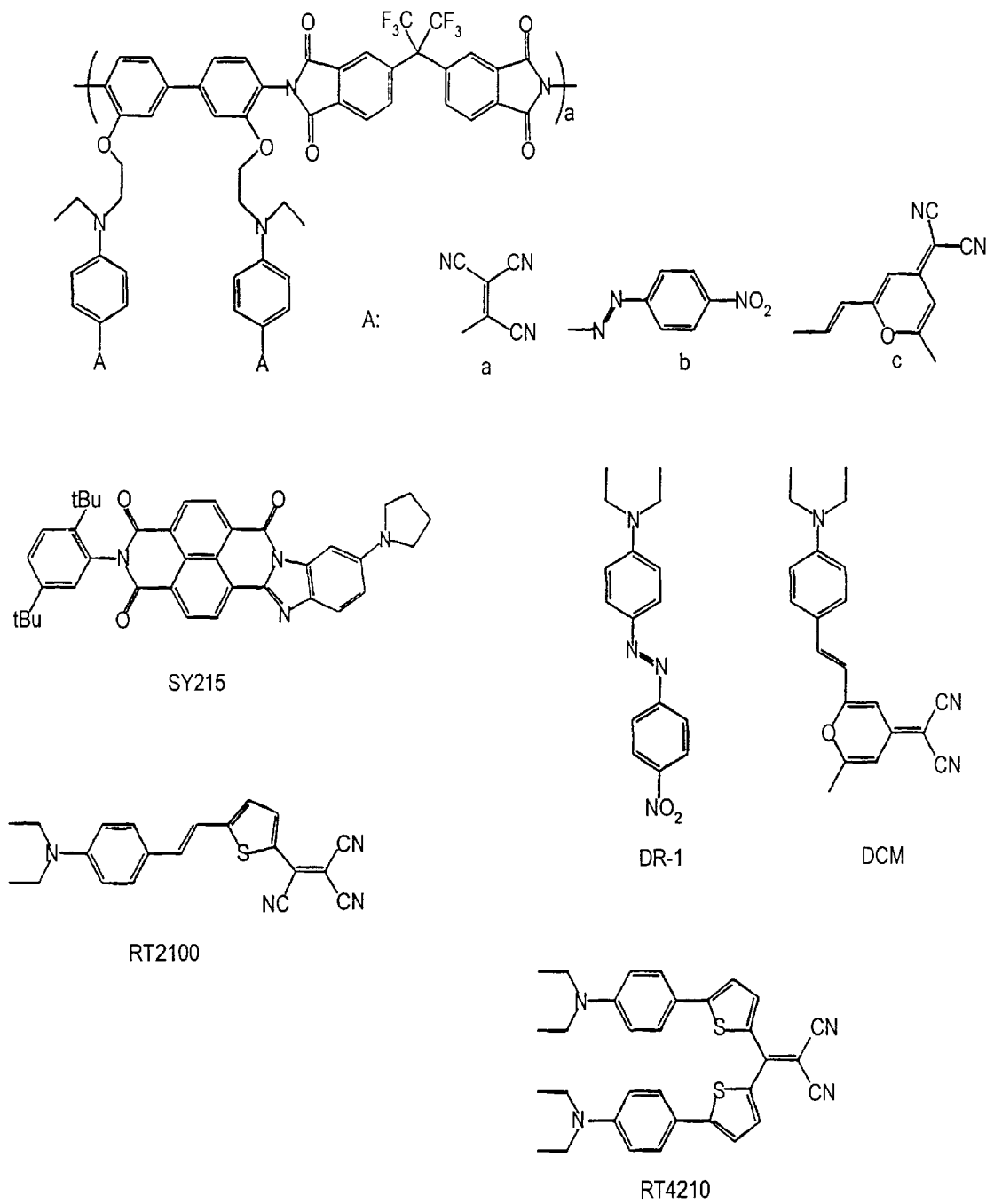
FIGS. 21A and 21B illustrate some electro-optic polymers that can be used in a switch of this invention.
Figure 21B:
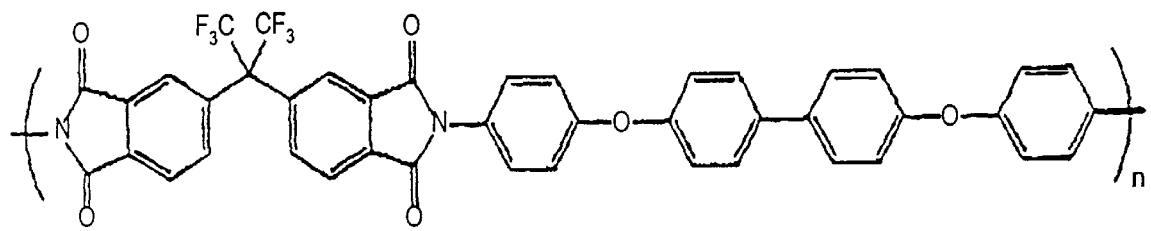
Figure 21B:
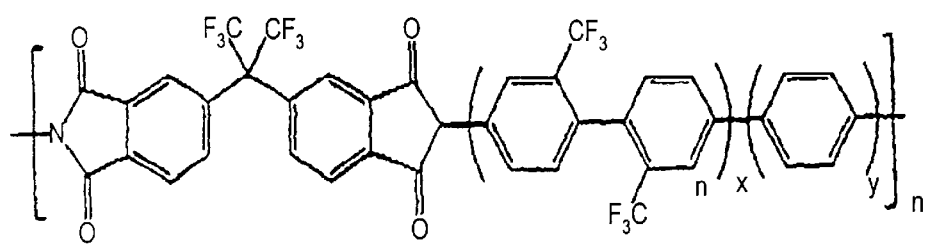
Figure 21B:
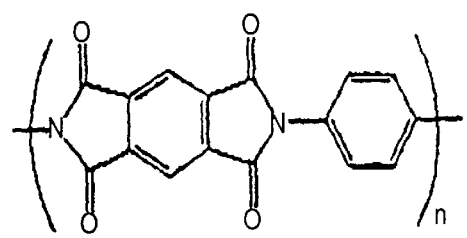

There are many examples of optical materials from which a hybrid digital electro-optic switch can be fabricated. A difference in refractive index can be achieved by using different materials in the cores and/or the cladding or by applying an electric field to an electro-optic polymer. Electro-optic polymer materials are preferred electro-optic materials. Chromophores such as DR-1, DCM, RT2108, RT 4210, or SY215 may be grafted onto passive materials such as Amoco Chemical Company's Ultradel 4212 or Hitachi Chemical Corporation's PIQ L100, OPI 1305, or OPI 2005 to form an electro-optic material (see FIGS. 21A and 21B for the structures of these materials, where "A" on the polymer structure may be any of the substituents shown in "a," "b," or "c"). Other electro-optic polymers include Enichem's polymers disclosed in U.S. Pat. Nos. 5,395,556 and 5,514,799, each of which is incorporated by reference herein. A hybrid digital electro-optic switch made with an electro-optic polymer can be manufactured easily and at low cost. Electro-optic materials can also be large bandgap crystals (such as $LiNbO_3$ or $KNbO_3$) or semiconductors (such as GaAs, InGaAs and other Group III-V compounds) that have been doped with a metal such as titanium to form cores and cladding regions. A hybrid digital electro-optic switch can also be fabricated into a multiple-quantum-well device by e.g. chemical vapor deposition to become a very low switching voltage device. Passive materials have little or no electro-optic effect, and typical examples of passive materials include Amoco's Ultradel 4212 and Hitachi's PIQ L100, OPI 1305, and OPI 2005. Cladding materials can be electro-optic or passive materials such as polyimide, polyacrylate (such as polymethylmethacrylate), benzylcyclobutene, or polyquinoline. The materials used to produce cores and/or cladding can be selected from a wide range of materials, including organic materials, inorganic materials and hybrid organic/inorganic materials, such as sol-gel glasses in a polymeric matrix. The electro-optic material in a core or cladding preferably has a refractive index equal to the refractive index of its neighboring core or cladding, respectively, either in the presence or absence of an applied electric field.

Preferably, the hybrid portion of the switch is made of an optical material having a refractive index that is approximately equal to its neighboring materials. In many instances, the hybrid material (e.g. core) has no more than a ±0.001 difference in its refractive index when compared to its corresponding material (e.g. core). The change in refractive index that an electro-optic material experiences is selected depending on the desired change in optical signal and the dimensions of the optical device in which the electro-optic material is incorporated, and a typical change in refractive index for coupled waveguides is 0.010 units. Using a core or cladding material in the hybrid portion, which material has properties that are similar to its surrounding materials, can provide the ability to change the electric field of the optical signal a controlled amount and thus can affect the properties of the signal without substantial loss of signal energy or addition of modes or harmonics to the optical signal.

Where a hybrid digital electro-optic switch of this invention has hybrid cores, it is not necessary for one entire core of the switch to be made of a first core material and another entire core to be made of a second core material. A hybrid digital electro-optic switch of this invention needs only to have a hybrid "button" as disclosed in our copending patent application, which permits the user to alter the properties of the optical signal in a particular area of the switch. Thus, it is only necessary for a portion of the first core to be made using the first core material, and e.g. the remainder of the first core and the entire second core can be made of the second core material. Likewise, hybrid cladding may be confined to one area or region of the switch as part of a hybrid "button."

A hybrid digital electro-optic switch of this invention may be a stand-alone part, where no other electronic components are integrated with the switch on a substrate. Or, a hybrid digital electro-optic switch of this invention may be part of an integrated structure, where the switch is one component of many that are fabricated on a particular substrate. For example, a switch of this invention may be integrated with input waveguides, output waveguides or other waveguides and mirrors on a substrate. Or, for example, a switch of this invention may be integrated with lasers, optical signal detectors, and/or logic devices.

Hybrid digital electro-optic switches can be used in such advanced technologies as telecommunications, data communications, computer interconnects, CATV, instrumentation, optical computing and optical signal processing, wavelength division multiplex add/drop switches, optical cross-point switches, optical time division multiplex switches, and any areas where optical fiber cables are used. For example, a hybrid digital electro-optic switch with n coupled channel waveguides can perform as a rail tap switch for computer buss architecture applications. For this device, with or without applied voltage, the optical energy of the input optical signal can be split to multiple outputs having equal or different optical power levels.

Descriptions of specific designs and dimensions are provided only as examples. It is to be understood that various modifications to the preferred embodiments will be readily apparent to those skilled in the art. Thus, while preferred embodiments of the invention have been disclosed, it will be readily apparent to those skilled in the art that the invention is not limited to the disclosed embodiments but, on the contrary, is intended to cover numerous other modifications and broad equivalent arrangements that are included within the spirit and scope of the following claims.

We claim:

1. A hybrid digital electro-optic switch for transmitting an optical signal that has an electric field and a power, said switch comprising at least two cores and at least two cladding materials forming a cladding around the cores, each core of said at least two cores having an output portion and transmitting an amount of the power of the optical signal at its respective output portion when the optical signal is transmitted through the switch, said amount being between zero and the power of the optical signal, wherein at least one of the cladding materials is an electro-optic material that exhibits a change in refractive index in an applied electric field, wherein one other of the cladding materials is a material that has a change in refractive index that is less than the change in refractive index of said electro-optic material in the applied electric field, and wherein the electro-optic material is positioned on the switch such that the electro-optic material effects a change in the electric field of the optical signal when the electro-optic material is in the applied electric field, thereby changing the amount of power of the optical signal at the output portion of each of said cores.

2. The hybrid digital electro-optic switch of claim 1 wherein said cores comprise a passive material.

3. The hybrid digital electro-optic switch of claim 1 wherein the second of the cladding materials comprises a passive material.

4. The hybrid digital electro-optic switch of claim 3 wherein said cores comprise a passive material.

5. The hybrid digital electro-optic switch of claim 4 wherein said cladding materials and said cores comprise polymeric materials.

6. The hybrid digital electro-optic switch of claim 4 wherein said switch comprises no more than two cores.

7. The hybrid digital electro-optic switch of claim 4 wherein the cladding material of said switch consists essentially of an electro-optic material and a passive material.

8. The switch of claim 7 wherein said cores are formed over a substrate that has a width, a length, a depth, and a surface spanning the width and the length of the substrate, and said cores are substantially coplanar with the surface of the substrate.

9. A hybrid digital electro-optic switch for carrying an optical signal which has an electric field, said hybrid digital electro-optic switch comprising at least two cores and cladding, wherein the cladding contains at least two different cladding materials individually in said cladding, wherein at least one of the cladding materials is an electro-optic material that changes refractive index in the presence of an applied electric field, wherein a second of the cladding materials is either a passive material or an electro-optic material that changes refractive index less than the first material in the same electric field, and wherein the electro-optic material is located in the cladding such that the electro-optic material affects the electric field of said optical signal when the electro-optic material is in the applied electric field.

10. The hybrid digital electro-optic switch of claim 9 wherein the second of the cladding materials is a passive material.

11. The hybrid digital electro-optic switch of claim 10 wherein the cores comprise a passive material.

12. The hybrid digital electro-optic switch of claim 11 wherein said cladding and said cores comprise polymeric materials.

13. The switch of claim 12 wherein said cores are formed over a substrate that has a width, a length, a depth, and a surface spanning the width and the length of the substrate, and said cores are substantially coplanar with the surface of the substrate.

14. The hybrid digital electro-optic switch of claim 11 wherein the cladding material of said switch consists essentially of an electro-optic material and a passive material.

15. The hybrid digital electro-optic switch of claim 11 wherein said switch has no more than two cores.

16. The hybrid digital electro-optic switch of claim 9 wherein the cores comprise a passive material.

17. A hybrid digital electro-optic switch comprising a cladding having therein an output core and at least a first and a second core, wherein a. the first core comprises a first core material, which first core material has a refractive index that changes in response to an applied electric field, b. the second core comprises a second core material, which second core material undergoes a change in refractive index in response to an applied electric field that is less than the change in refractive index for said first core material, c. the cladding is positioned over a substrate that has a width, a length, a depth, and a surface spanning the width and the length of the substrate, the first and second cores are substantially coplanar with the surface of the substrate, said first and second cores are positioned within the cladding so that the first and second cores evanescently couple under evanescent coupling conditions, and the first and second core materials provide an evanescent coupling between the first and second cores that changes in response to changes in the applied electric field, and d. the output core abuts the first core.

18. A hybrid digital electro-optic switch comprising at least two cores and cladding, wherein the cladding is positioned over a substrate that has a width, a length, a depth, and a surface spanning the width and the length of the substrate, the first and second cores are substantially coplanar with the surface of the substrate, at least one of said cores is comprised of a first material comprising an electro-optic material that changes refractive index in the presence of an electric field, and wherein a second of said at least two cores is either a passive material or an electro-optic material that changes refractive index less than the first material in the same electric field.

19. A hybrid digital electro-optic switch having at least three cores, wherein a. said at least three cores evanescently couple under evanescent coupling conditions;

b. at least three materials are used individually to form the cores and the cladding of the hybrid digital electro-optic switch, c. at least three of the materials used to form the cores and the cladding of the hybrid digital electro-optic switch each has a refractive index that is different from the other of the three materials, d. a first material of said at least three materials undergoes a change in refractive index in response to an applied electric field, and e. a second material of said at least three materials undergoes a change in refractive index in response to an applied electric field that is less than the change in refractive index for said first material.

20. The hybrid digital electro-optic switch of claim 19 having a first, a second, and a third core, wherein a. the first core comprises the first material, which first material has a refractive index that changes in response to an applied electric field, b. the second core comprises the second material, which second material undergoes a change in refractive index in response to an applied electric field that is less than the change in refractive index for said first material, c. the third core comprises the first material, and d. said first, second, and third cores are positioned in the cladding so that the first, second, and third cores evanescently couple under evanescent coupling conditions, and the first and second materials provide an evanescent coupling among the first, second, and third cores that changes in response to changes in the applied electric field.

21. The hybrid digital electro-optic switch of any of claims 17–20 wherein the second material is a passive material.

22. The hybrid digital electro-optic switch of any of claims 17–20 wherein the cores and the cladding comprise polymeric materials.

23. A hybrid digital electro-optic switch comprising a. a lower section having a first, a second, a third, a fourth, and a fifth lower region, said lower section being positioned over a substrate that has a width, a length, a depth, and a surface spanning the width and the length of the substrate, the lower section being substantially coplanar with the surface, b. a middle section having a first, a second, a third, a fourth, and a fifth middle region, and c. an upper section having a first, a second, a third, a fourth, and a fifth upper region, d. wherein the second and fourth middle regions each are formed of a material having a refractive index sufficient that the second and fourth regions of the middle section are cores under light transmitting conditions;

e. wherein the second and fourth middle regions are spaced sufficiently closely that the second and fourth regions evanescently couple when light is transmitted into at least one of the second and fourth regions;

f. wherein the second middle region is adjacent to the second lower region, the second upper region, and the first and third middle regions;

g. wherein the fourth middle region is adjacent to the fourth lower region, the fourth upper region, and the third and fifth middle regions; and h. wherein at least one of the following conditions is satisfied:

i) when the second or fourth lower region is formed of an electro-optic material, the other of the second or fourth lower region is formed of a passive material, ii) when the second or fourth upper region is formed of an electro-optic material, the other of the second or fourth upper region is formed of a passive material;

iii) when the first, third, or fifth middle region is formed of an electro-optic material, at least one of the other of the first, third, or fifth middle region is formed of a passive material;

iv) when the second or fourth middle region is formed of an electro-optic material, the other of the second or fourth middle region is formed of a passive material and the region formed of an electro-optic material abuts an output core comprised of a passive material.

24. A hybrid digital electro-optic switch made by the method comprising the steps of:

a) providing a base;

b) forming coupled cores on said base; and c) providing cladding elements between the coupled cores;

d) wherein at least two of the coupled cores or at least two of the cladding elements between the coupled cores are each separately formed of a first material and a second material, wherein the first material has a refractive index that differs from the second material, and said second material has less of a change in its refractive index in the presence of an electric field than said first material; and e) wherein the other of the coupled cores or the cladding elements are formed of a third material that has a refractive index that differs from the refractive index of the first and the second materials.

25. The switch of claim 24 wherein the base comprises a polymeric cladding, the first material comprises a first polymer, and the second material comprises a second polymer.

* * * * *